(12) United States Patent
Burns et al.

(10) Patent No.: US 8,870,991 B2
(45) Date of Patent: Oct. 28, 2014

(54) NATURAL GAS PRODUCTION FILTRATION VESSEL AND ASSEMBLY

(75) Inventors: David J. Burns, Mineral Wells, TX (US); Daniel M. Cloud, Weatherford, TX (US)

(73) Assignee: PECOFacet (US), Inc., Franklin, TN (US)

( * ) Notice: Subject to any disclaimer, the term of this patent is extended or adjusted under 35 U.S.C. 154(b) by 594 days.

(21) Appl. No.: 13/006,537

(22) Filed: Jan. 14, 2011

(65) Prior Publication Data

US 2011/0173936 A1 Jul. 21, 2011

Related U.S. Application Data

(60) Provisional application No. 61/295,398, filed on Jan. 15, 2010, provisional application No. 61/301,890, filed on Feb. 5, 2010.

(51) Int. Cl.
*B01D 46/00* (2006.01)
*B01D 46/12* (2006.01)

(52) U.S. Cl.
CPC ............ *B01D 46/12* (2013.01); *B01D 46/0024* (2013.01); *B01D 46/003* (2013.01)
USPC .................. 55/410; 55/411; 55/418; 55/420; 55/476; 55/482

(58) Field of Classification Search
CPC ................. B01D 46/03; B01D 46/24
USPC ........... 55/410, 411, 418, 420, 476, 478, 482, 55/486
See application file for complete search history.

(56) References Cited

U.S. PATENT DOCUMENTS

| | | | | |
|---|---|---|---|---|
| 4,632,755 A | * | 12/1986 | DeGraffenried | 210/314 |
| 5,667,546 A | * | 9/1997 | Boring | 55/503 |
| 5,827,430 A | | 10/1998 | Perry, Jr. et al. | |
| 5,893,956 A | | 4/1999 | Perry, Jr. et al. | |
| 2005/0029183 A1 | * | 2/2005 | Sternad et al. | 210/331 |
| 2005/0172810 A1 | * | 8/2005 | Burns et al. | 95/273 |
| 2006/0108267 A1 | | 5/2006 | Warren et al. | |
| 2007/0095743 A1 | | 5/2007 | Grodecki | |
| 2007/0294987 A1 | * | 12/2007 | Hunsinger et al. | 55/486 |
| 2008/0138712 A1 | | 6/2008 | Suzuki | |
| 2009/0094951 A1 | | 4/2009 | Baseotto et al. | |

OTHER PUBLICATIONS

U.S. Appl. No. 13/006,956, filed Jan. 14, 2011, Burns et al.
U.S. Appl. No. 61/295,398, filed Jan. 15, 2010, Burns et al.
U.S. Appl. No. 61/295,481, filed Jan. 15, 2010, Burns et al.

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

A filtration device that includes a pressure vessel having an inlet and an outlet, the filtration device configured to filter a pressurized fluid stream. In an embodiment, the filtration device has at least one disk-shaped filter element housed within the pressure vessel arranged to filter fluid flowing from the inlet to the outlet, and an inlet flow tube disposed within the pressure vessel proximate the inlet tube, wherein the inlet flow tube is configured to direct the pressurized fluid stream from the inlet tube towards a central portion of the at least one disk-shaped filter element.

18 Claims, 14 Drawing Sheets

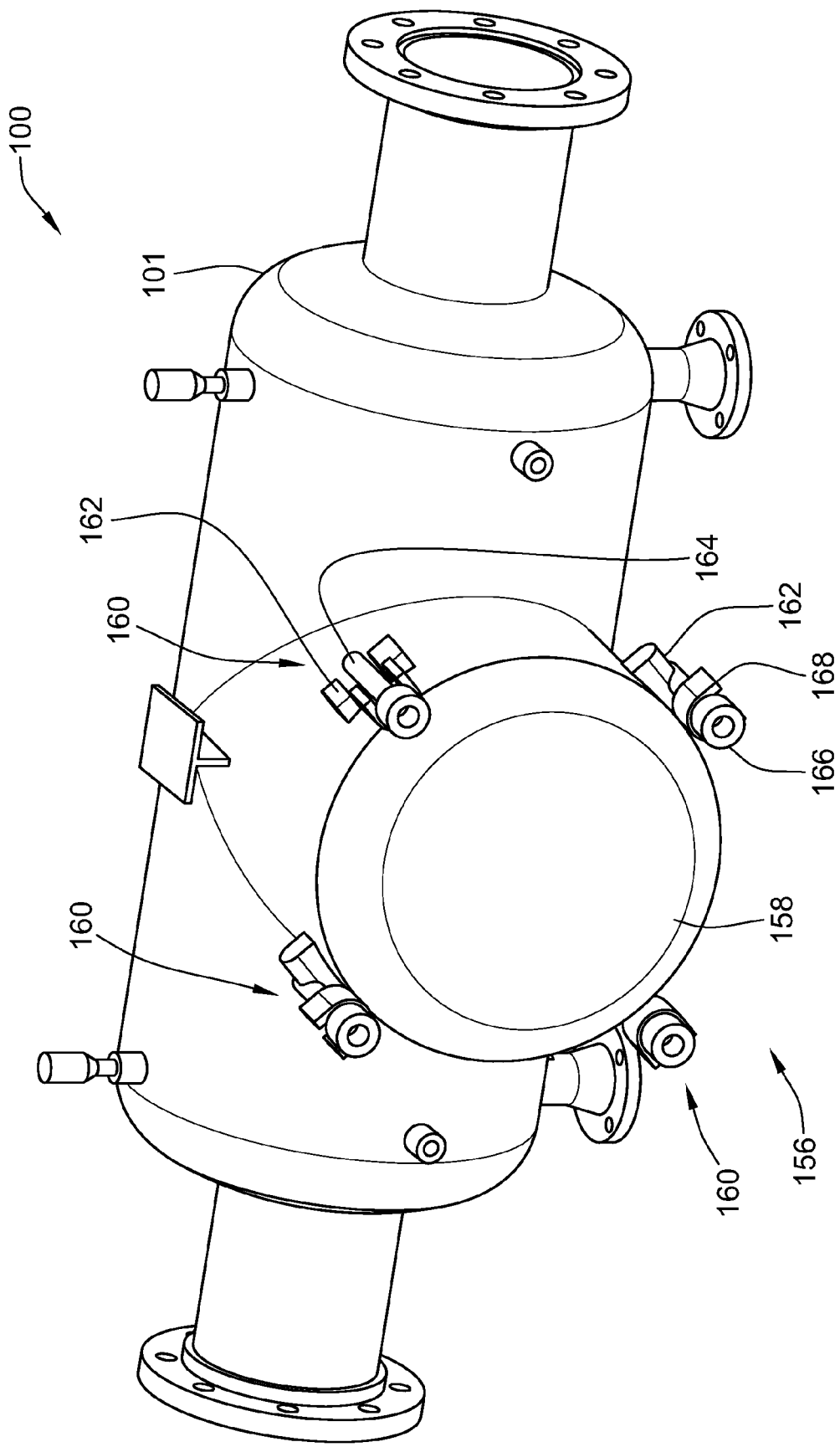

NATURAL GAS PRODUCTION FILTRATION VESSEL AND ASSEMBLY

CROSS-REFERENCE TO RELATED PATENT APPLICATIONS

This patent application claims the benefit of U.S. Provisional Patent Application Nos. 61/295,398 filed Jan. 15, 2010 and 61/301,890 filed Feb. 5, 2010, the entire teachings and disclosures of which are incorporated herein by reference thereto.

FIELD OF THE INVENTION

The present invention generally relates to filtration systems, and, more particularly, to filter media and pressure vessels used in filtration systems.

BACKGROUND OF THE INVENTION

Natural gas, in its original state as it emerges from the well, contains various impurities, particulates and entrained liquids, which must be removed before the gas can be used by consumers. Typically, after the well is drilled, natural gas may be extracted from the ground using a compressor. Generally, such wells produce gas at a relatively low pressure. In some cases, natural gas producers employ production equipment that includes a driver and compressor along with related support equipment. Gas from a number of wells may be collected in a main pipeline and transported to a gathering facility, where the gas is processed using, for example, filtration, separation, and solvent extraction to remove contaminants prior to sending the gas to downstream processing plants.

One problem with natural gas production is that contaminants entrained in gas as it flows from the well can degrade the processing equipment. Compressors may be shut down by excessively contaminated natural gas. For example, salt deposits in the gas can plate out on high-temperature machine parts leading to excessive downtime and maintenance costs. Coal particulates can coat the internal components of compressors and equipment engines leading to increased maintenance. Also liquid slugging can cause the shut down and increased maintenance of compressors and other equipment, such as gas dehydration units downstream.

Conventional filtration systems may use inertial impaction, in which the natural gas is routed through a series of barriers, wherein each barrier forces the natural gas to flow in a different direction. The impact between the barrier and the natural gas causes contaminants to settle out of the natural gas. At the same time, this method can have the effect of significantly reducing the flow of natural gas through the filtration system.

The problem of restricted natural gas flow out of filtration systems only worsens as the filter elements become loaded with contaminants. Besides being costly, for filtration systems that use three or four cartridge-type filter elements, replacements of the filter elements may involve substantial downtime, as, typically, each filter element has a separate access port. As such, the filtration system pressure vessel may have four separate access ports, all of which would have to be accessed to replace the filter elements.

To protect natural gas processing equipment, the gas is typically filtered as it flows from the well. Typically, conventional filtration systems use pressure vessels that house a plurality of cartridge-type, canister-type, or tubular type filter elements, which may include, for example, a number of layers of pleated filter media or spirally wound media, as in U.S. Pat. No. 5,827,430. These types of filter elements may be multi-stage filter elements with very high efficiency ratings. Such cartridge-type filter elements tend to be costly, and may also be bulky and difficult to handle. Moreover, these types of filter elements may be relatively small and require frequent replacement because the buildup of particulates and entrained liquids within the filter elements leads to clogging and potential failure of the filter. The need to replace filter elements on a frequent basis further increases the operational costs of the filtration system. Additionally, the high-efficiency filter elements may also restrict the flow of natural gas across the filter element, further reducing the flow out of the filtration system.

It would therefore be desirable to have a natural gas filtration system that utilizes filter elements that are less expensive than conventional filter elements used in conventional filtration systems. It would also be desirable to have a natural gas filtration system in which the less-expensive filter element does not significantly restrict the flow of natural gas, and could be easily installed and removed, thereby minimizing downtime for the filtration system. Embodiments of the invention provide such a filtration system and such a filter element.

BRIEF SUMMARY OF THE INVENTION

In one aspect, embodiments of the invention provide a filtration device that includes a pressure vessel having an inlet and an outlet, the filtration device configured to filter a pressurized fluid stream. In an embodiment, the filtration device has at least one disk-shaped filter element housed within the pressure vessel arranged to filter fluid flowing from the inlet to the outlet, and an inlet flow tube disposed within the pressure vessel proximate the inlet tube, wherein the inlet flow tube is configured to direct the pressurized fluid stream from the inlet tube towards a central portion of the at least one disk-shaped filter element.

In another aspect, embodiments of the invention provide a filtration device that includes a pressure vessel configured to filter a pressurized fluid stream. In an embodiment, the pressure vessel has a tubular portion with first and second domed portions at opposite ends of the tubular section, an inlet tube attached at one end to an opening in the first domed portion, and an outlet tube attached at one end to an opening in the second domed portion. Further, embodiments of the filtration device include at least one disk-shaped filter element housed within the pressure vessel, and an access port integral with the pressure vessel. In embodiments, the access port is disposed between the inlet tube and the outlet tube, such that the access port is configured to permit installation and removal of the at least one disk-shaped filter element by hand.

In yet another aspect, embodiments of the invention provide a filtration device that includes a pressure vessel configured to filter a pressurized flow stream, the pressure vessel having an inlet flow tube, an outlet flow tube, and an interior surface. Embodiments of the filtration device also include at least one disk-shaped filter element housed within the pressure vessel, and disposed between the inlet flow tube and the outlet flow tube, wherein the pressure vessel is sized such that there is sufficient clearance between the interior surface and an outer perimeter surface of the at least one disk-shaped filter element to allow the at least one disk-shaped filter element to slide in an axial direction between the inlet flow tube and the outlet flow tube.

In still another aspect, embodiments of the invention provide a production system for natural gas, wherein the production system includes a pipeline configured to transport natural gas from a well, a gas dehydration unit, a gas coalescer coupled upstream to an upstream side of the gas dehydration unit, a gas compressor coupled to an upstream side of the gas coalescer, a liquid separator coupled to an upstream side of the gas compressor, and a filtration device couple coupled between a liquid slug catcher and the liquid separator. In an embodiment, the filtration device is configured to filter impurities from the natural gas as it flows from the liquid slug catcher. In an embodiment, the filtration device includes a pressure vessel configured to filter a pressurized fluid stream, wherein the pressure vessel has an inlet at a first end and an outlet at a second end opposite the first end. Further, embodiments of the filtration device include at least one disk-shaped filter element housed within the pressure vessel, and an inlet flow tube disposed within the pressure vessel proximate the inlet. In an embodiment of the invention, the inlet flow tube is configured to direct a fluid flow from the inlet towards a central portion of the at least one disk-shaped filter element.

Yet in another aspect, embodiments of the invention provide a method of filtration that includes the steps of installing a first disk-shaped filter element in a pressure vessel configured to receive a pressurized fluid flow, wherein the first disk-shaped filter element is installed such that an upstream axial face is substantially perpendicular to a direction of the pressurized fluid flow. Embodiment of the method further include directing the pressurized fluid flow towards the center of the upstream axial face to promote axial loading of the first disk-shaped filter element, and configuring the pressure vessel to promote the radial loading of the first disk-shaped filter element to occur simultaneously with the axial loading.

In still another aspect, embodiments of the invention provide a filtration device having a pressure vessel configured to filter a pressurized fluid stream, wherein the pressure vessel has a tubular portion with first and second domed portions at opposite ends of the tubular section, an inlet tube attached at one end to an opening in the first domed portion, and an outlet tube attached at one end to an opening in the second domed portion. Further, embodiments of the filtration device include at least one disk-shaped filter element housed within the pressure vessel, and an outlet flow tube disposed within the pressure vessel proximate the outlet. In an embodiment, the outlet flow tube is configured to sealingly engage the at least one disk-shaped filter element when the at least one disk-shaped filter element is subjected to the pressurized fluid stream.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a perspective view of the filtration system, according to an embodiment of the invention;

Figure 1:
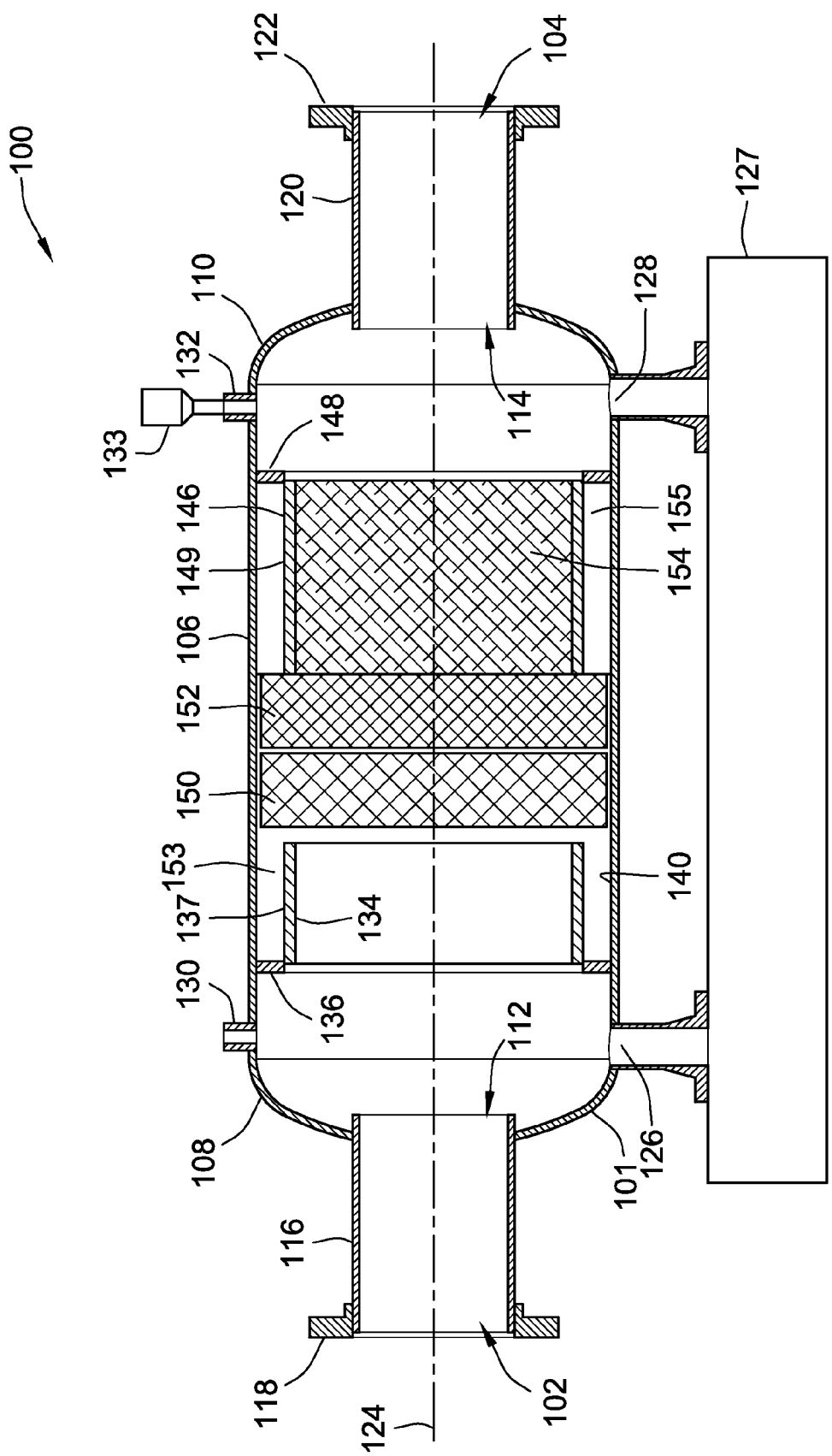
FIG. 1 is a plan view of a filtration system that includes a pressure vessel and disk-shaped filter elements, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIGS. 1-7 illustrate one type of filtration system 100 suitable for use in the filtration of a gas having various solid and semi-solid particulate contaminants, as well as entrained liquid contaminants, both of which must typically be removed before the gas can be processed and used. As can be see from the figures, the filtration system 100 includes a pressure vessel 101 with an access port 156 that may be a single access port 156, to allow installation and removal of and/or access to disk-shaped filter elements 150, 152 contained in the pressure vessel 101. The single access port 156 is approximately as large in diameter as the body, or main tubular section 106, of the filtration system pressure vessel 100.

While it is contemplated that pressure vessels of the type illustrated may be used in either a horizontal or a vertical orientation without substantially changing the principle of operation, when describing the operation of the pressure vessel herein, for illustrative purposes, the pressure vessel herein will primarily be described as horizontally oriented, consistent with the figures. It should also be noted that, while embodiments of the invention will be described herein with respect to the filtering of natural gas streams, alternate embodiments of the invention can also be used to filter solids and immiscible liquids from pressurized liquid streams.

As can also be seen from FIGS. 1-7, an embodiment of the invention includes a filtration system 100 with a pressure vessel 101 configured to house a disk-shaped filter element 150, 152, which in at least one embodiment are disposed side-by-side in the filtration system pressure vessel 101. The disk-shaped filter element 150, 152 may have a substantial thickness, indicative of a depth-loading filter media. By employing a media adapted to load throughout a relatively thick cross-section, the filtration system 100 avoids some-what the problems, i.e., loss of pressure at the output, caused by clogging that could result from the use of a primarily surface-loading media. Use of such a media often entails increased maintenance costs and downtime as a result of frequently-needed filter changes.

FIG. 1 shows a plan view of a filtration system 100 that includes a pressure vessel 101 constructed in accordance with an embodiment of the invention. The pressure vessel 101 has an inlet 102 and an outlet 104, preferably at opposite ends of the pressure vessel 101, with the filter elements disposed therebetween. The pressure vessel 101 further includes a filter chamber defined by a main tubular section 106 with a first domed section 108 and a second domed section 110 attached to opposite ends of the main tubular section 106. Domed section 108 has an opening 112 and domed section 110 has an opening 114. With this configuration, the pressure vessel 101 can handle substantial pressure loads, such as may be experienced at a natural gas well operation, for example. In an embodiment of the invention, the pressure vessel has a pressure rating of at least 2220 psi, and more preferably between 175 and 1480 psi. In alternate embodiments, the pressure vessel has a pressure rating of at least 50 psi.

The inlet 102 is formed through a tubular or cylindrical portion 116 with a flange 118 at one end of the cylindrical portion 116. The other end of the cylindrical portion 116 is attached at the opening 112 of the first domed section 108. Typically, the diameter of the cylindrical portion 116 of the inlet 102 is substantially smaller than the diameter of the main tubular section 106. Similarly, the outlet 104 also may be provided by a tubular or cylindrical portion 120 with a flange 122 at one end of the cylindrical portion 120. The other end of the cylindrical portion 120 is attached at the opening 114 of the second domed section 110. Typically, the diameter of the cylindrical portion 120 of the outlet 104 is substantially smaller than the diameter of the main tubular section 106. In an embodiment of the invention, the pressure vessel main tubular section 106, the inlet cylindrical portion 116, and the outlet cylindrical portion 120 all share a longitudinal axis 124. However, it is contemplated that in alternate embodiments, the pressure vessel main tubular section 106, the inlet cylindrical portion 116, and the outlet cylindrical portion 120 each have a different longitudinal axis.

Still referring to FIG. 1, the pressure vessel 101 also includes an inlet drain 126 at a bottom portion of the first domed section 108, and an outlet drain 128 at a bottom portion of the second domed section 110. The inlet drain 126 and outlet drain 128 are configured to allow for the removal of liquids extracted from the gas flow through the pressure vessel 101. In the embodiment of FIG. 1, the inlet drain 126 is normally used to drain the housing prior to element change-outs. The outlet drain 128 will be used to remove liquids extracted by the filter. The extracted liquids will empty into a collection sump 127. Periodically, or when full, the contents of the collection sump 127 are removed by the system operator. In at least one embodiment, the inlet drain 126 is opened intermittently, for example when changing disk-shaped filter elements 150, 152, and normally closed at other times, for example during operation. In this embodiment, the outlet drain 128 is normally open to automatically drain away fluid, such as those captured by an optional wire mesh mist extractor 154.

In the embodiment of FIG. 1, there is an outlet vent at 132 coupled to an outlet pressure relief valve 133 at the top portion of the second domed section 110. The inlet vent 130 is used for venting the housing of gas pressure prior to opening the lid for element changeouts. The outlet vent 132 and outlet pressure relief valve 133 are configured to prevent the internal pressure in the pressure vessel 101 from exceeding a threshold limit. When the pressure within the pressure vessel 101 exceeds the threshold, the vent 132 and pressure relief valve 133 operate to release gas from the pressure vessel 101, thus relieving the pressure.

Figure 1A:
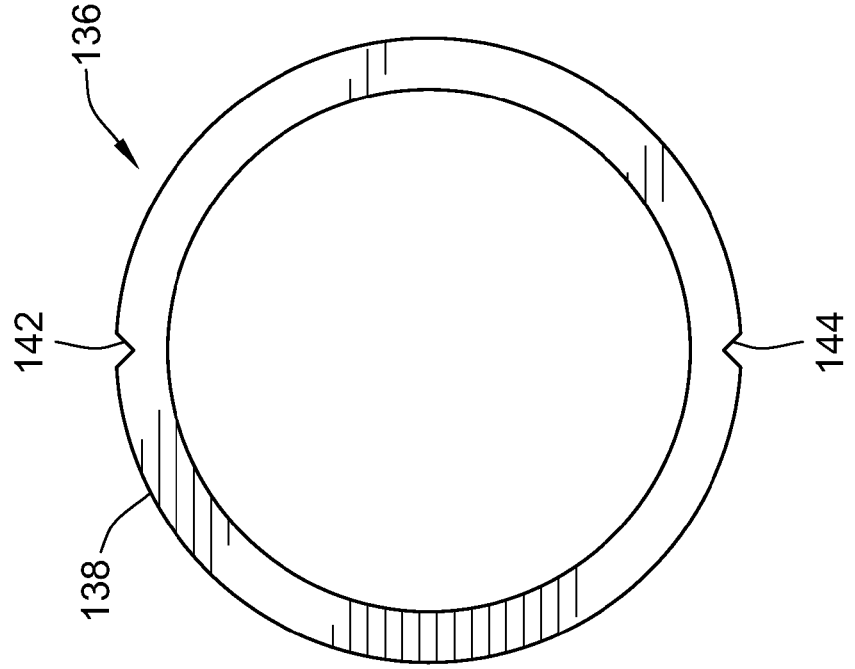
FIG. 1A is a plan view of an annular support ring for the inlet flow tube, according to an embodiment of the invention.

Within the main tubular section 106, there is an inlet flow tube 134, proximate the inlet 102, the inlet flow tube 134 having an annular flange in the form of a support ring 136 and a tubular portion 137. FIG. 1A shows an end view of the support ring 136. In at least one embodiment, an outer perimeter 138 of the support ring 136 is attached, for example by welding, to an interior surface 140 of the main tubular section 106. In the embodiment of FIG. 1A, the support ring 136 includes a first notch 142 towards the top of the support ring 136, and a second notch 144 towards the bottom of the support ring 136. The first notch 142 towards the top of the support ring 136 serves to vent oxygen from the vessel during start up. The second notch 144 towards the bottom of the support ring 136 allows any liquid collected at the bottom of the interior of the pressure vessel 101, on either side of the support ring, to flow to the inlet drain 126 so that it can be removed from the pressure vessel 101.

Also within the main tubular section 106 is an outlet flow tube 146 having an annular flange in the form of a support ring 148 and a tubular portion 149. In at least one embodiment, the support ring 148 on the outlet flow tube 146 is identical to, and serves the same function as, the support ring 136 on the inlet flow tube 134. The tubular portion 137 of the inlet flow tube 134 and the tubular portion of the outlet flow tube 146 have inner and outer diameters smaller than the inner diameter of the main tubular section 106. In the embodiment of FIG. 1, the inlet flow tube 134 and outlet flow tube 146 have tubular portions 137, 149 of the same diameter. In another embodiment, support grids can be added to the face of flow tubes 146 and 134 to add support to filters 150 and 152 as needed for extreme flow conditions.

Between the inlet flow tube 134 and outlet flow tube 146 are removable first and second disk-shaped filter elements 150, 152. In an embodiment of the invention, the first disk-shaped filter element 150 is a filter disk, configured to remove primarily solid and semi-solid contaminants from a flow of gas through the filter disk 150. The second disk-shaped filter element 152 is a coalescer disk, configured to remove smaller particles and to coalesce liquids entrained in the flow of gas through the coalescer disk 152 for subsequent extraction. Accordingly, the coalescer disk 152 will normally have a smaller pore-size distribution than that for the filter disk 150. By directing a flow of natural gas first through the filter disk 150 then the coalescer disk 152, the flow of natural gas is exposed to a filter media gradient in which the pore size distribution goes from larger to smaller as the flow moves through the disk-shaped filter elements 150, 152. In embodiments of the invention, the coalescer disk 152 has a smaller average pore size than the filter disk 150. While embodiments of the invention described herein may include a filter disk 150 and a coalescer disk 152, alternate embodiments may have a single disk-shaped filter element that performs the functions of both disk-shaped filter elements 150, 152. Further, other embodiments of the invention include more than two stacked disk-shaped filter elements in face-to-face relation.

As mentioned above, the diameter of the inlet flow tube 134 is smaller than the inner diameter of the main tubular section 106 of the pressure vessel 101, such that there is an annular gap 153 between the tubular portion 137 of the inlet flow tube 134 and the interior surface 140 of the main tubular section 106. Similarly, there is an annular gap 155 between the tubular portion 149 of the outlet flow tube 146 and the interior surface 140 of the main tubular section 106. Consequently, the inlet and outlet flow tubes 134, 146 are able to direct the flow of natural gas through the disk-shaped filter elements 150, 152 so that loading of the filter elements 150, 152 is effected in a controlled manner. In an embodiment of the invention, the annular gaps 153, 155 range in size from 1 to 4 inches.

In operation, the reduced diameter of the inlet flow tube 134 with respect to the diameter of the pressure vessel 101 has the effect of directing the flow of natural gas from the inlet 102 more towards the center of the pressure vessel 101 than would be the case without the inlet flow tube 134. In an embodiment of the invention, the support ring 136 on the inlet flow tube 134 is attached to the interior surface 140 of the pressure vessel 101 at an angle to aid in directing the flow of natural gas toward the center of the pressure vessel 101. The configuration of the inlet flow tube 134 ensures that a portion of the natural gas stream flowing into the pressure vessel 101 is directed substantially at a center portion of the disk-shaped filter element 150.

While it is contemplated that the pressure vessel 101 may be produced in various sizes and configurations, in at least one embodiment of the invention, the main tubular section 106 of the pressure vessel 101 is 20 inches in diameter with 8-inch flanges 118, 122 at the inlet 102 and the outlet 104, respectively. In an embodiment of the invention, the length of the pressure vessel 101 is such that the inlet and outlet flanges 118, 122 are spaced between 64 and 70 inches apart. As it will be appreciated that different sized systems may be used for different natural gas operations, typically the inner diameter of the main tubular section 106 will be between 6 and 66 inches; the inner diameter of the inlet and outlet flow tubes 134, 146 will be between 2 and 54 inches; and the annular gap 153, 155 will be between 1 and 6 inches.

Still referring to FIG. 1, the optional wire mesh mist extractor 154 is disposed within the outlet flow tube 146. Typically, the wire mesh mist extractor is installed such that it fits snugly into the outlet flow tube 146. However, it is contemplated that the wire mesh mist extractor 154 may be configured such that it can be installed and removed from the outlet flow tube by hand without the aid of tools or fixtures. The wire mesh mist extractor 154 is configured to extract, through gravity, coalesced liquids from the coalescer disk 152. Liquids particles that impact the wire mesh mist extractor 154 are pulled by gravity to the bottom of the pressure vessel 101 and may be removed via the outlet drain 128. The wire mesh mist extractor 154 is removable, such that it may be removed, for example, when damaged, but typically stays in place, and is only accessed through access port 156 for cleaning.

Figure 2:
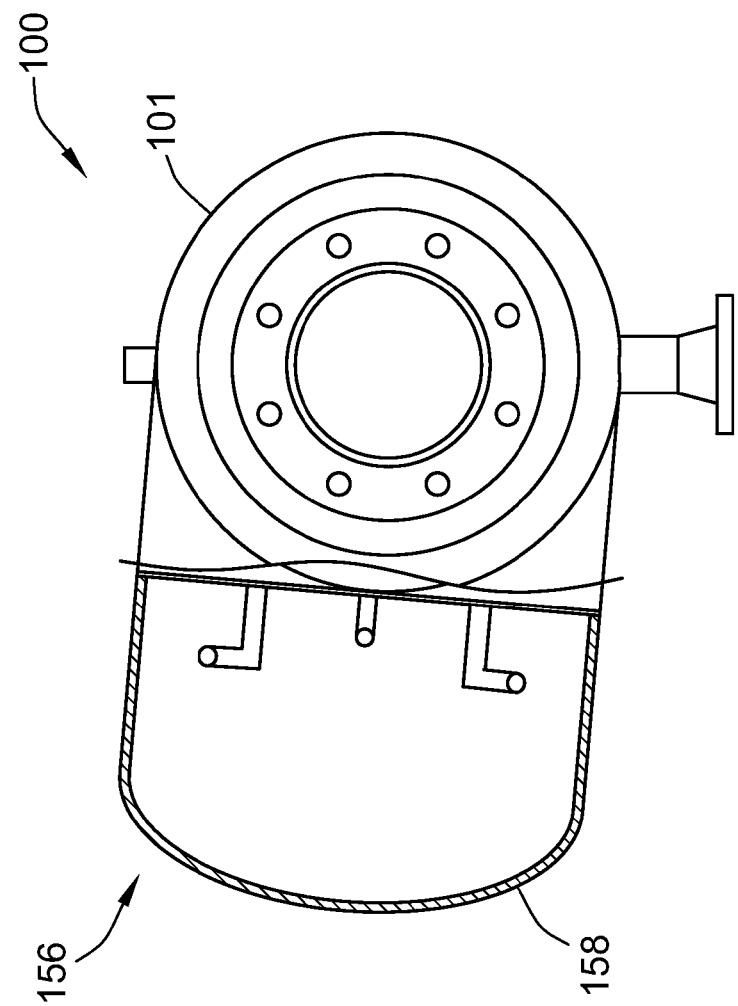
FIG. 2 is an end view of the filtration system of FIG. 1 that includes a view of the pressure vessel access port.

FIG. 2. shows an end view of the pressure vessel 101 that illustrates the access port 156, according to an embodiment of the invention. The access port 156 is secured by an access port door 158, also referred to as a hatch 158. In at least one embodiment, the access port 156 has a longitudinal axis 157 (in FIG. 6) that is substantially perpendicular to the longitudinal axis 124 of the pressure vessel 101. As can be seen in the perspective view of the FIG. 3, an embodiment of the invention includes an access port door 158 that is circular and secured to the access port 156 using four tabs 160 equally spaced about the circumference of the access port 156. In at least one embodiment, each of the tabs 160 includes a hinge-type mechanism 162 and a bolt 164 with a nut 166, or other suitable fastening device, that can be tightened against a U-shaped bracket 168, or a similar suitable device. The access port 156 provides the user access for the periodic replacement of the disk-shaped filter elements 150, 152, and for maintenance on the pressure vessel, when necessary. While the access port 156 is generally shown as being located on the side of the pressure vessel 101, it is contemplated that the access port 156 could also be located on a top portion of the pressure vessel 101.

Figure 4:
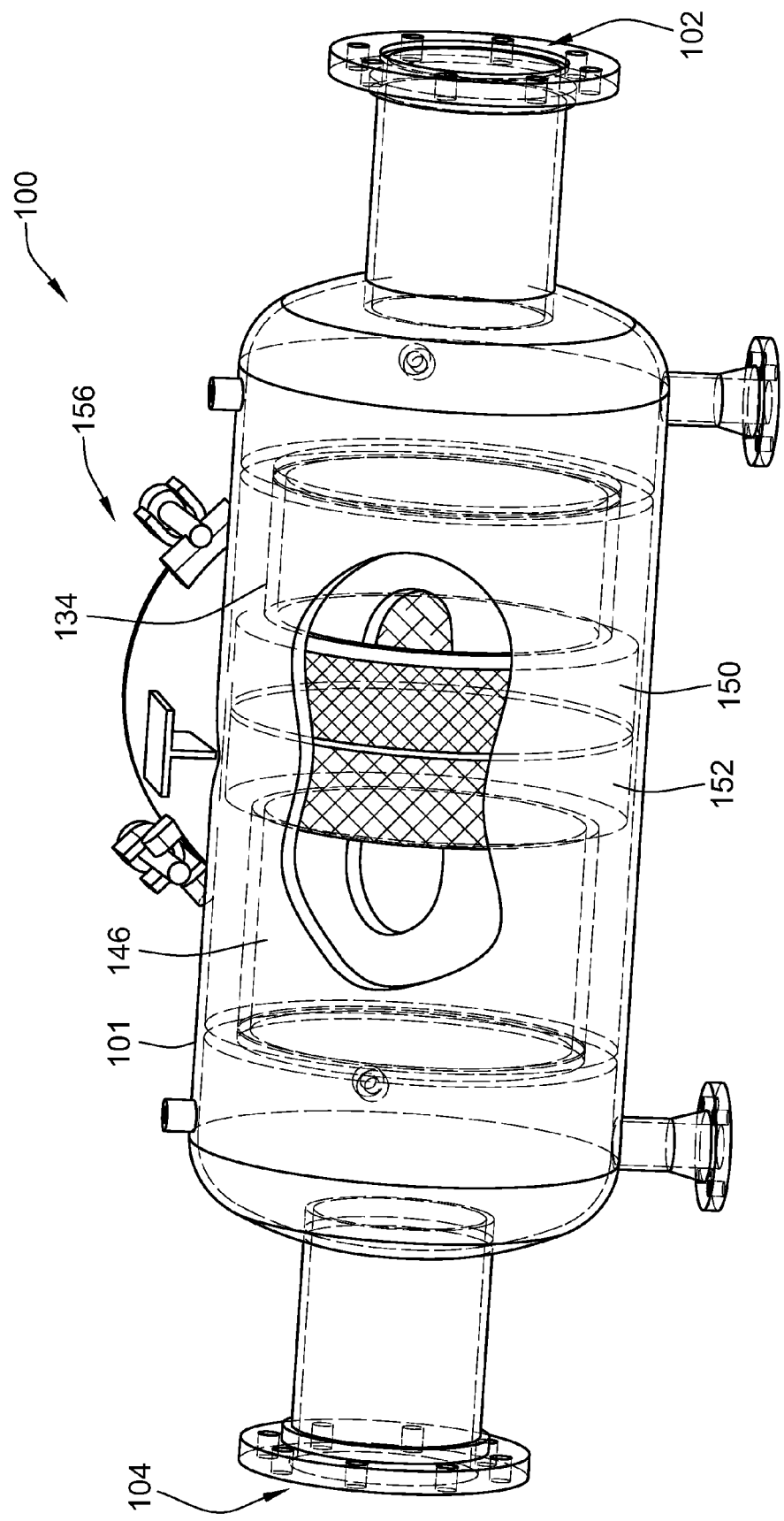
FIG. 4 is a perspective view of the filtration system of FIG. 3 with a cutout portion to show some of the interior components of the filtration system, according to an embodiment of the invention.
Figure 5:
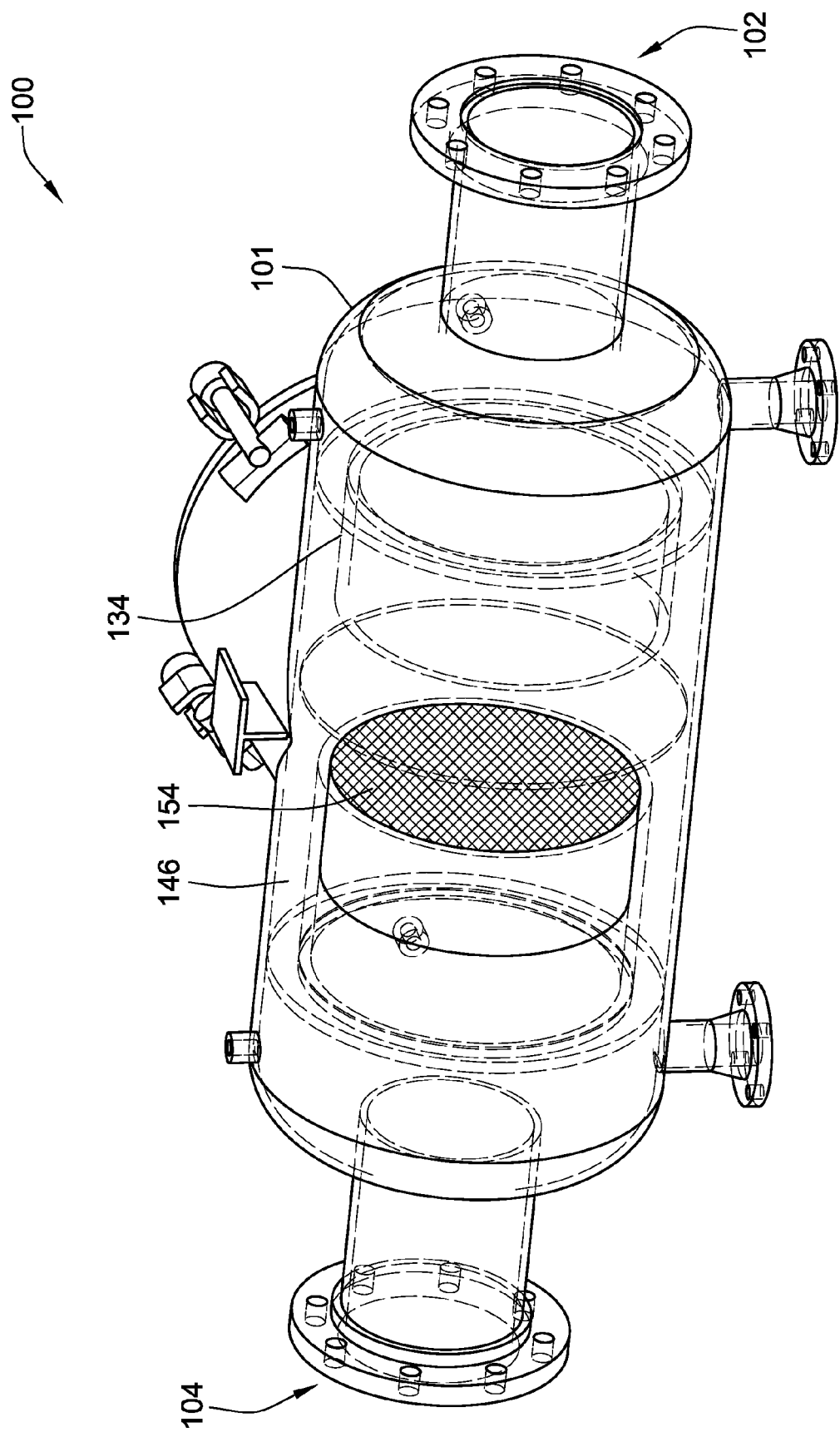
FIG. 5 is a perspective view of the filtration system of FIG. 3 with a cutout portion to show some interior components other than those shown in FIG. 4.

FIGS. 4 and 5 are perspective views of the pressure vessel 101 with cutout portions that show the arrangement of the disk-shaped filter elements 150, 152 (in FIG. 4), the inlet flow tube 134, and the outlet flow tube 146 in relation to the inlet 102, outlet 104, and access port 156. Because the disk-shaped filter elements 150, 152 take up most of the inner diameter of the pressure vessel 101, the diameter of the access port 156 must be approximately equal to the diameter of the main tubular section 106 of the pressure vessel 101 to facilitate installation and removal of the disk-shaped filter elements 150, 152. FIG. 5 shows the wire mesh mist extractor 154 disposed within the outlet flow tube 146. The access port 156 provides the user access to the wire mesh mist extractor 154 for cleaning or replacement, if damaged. In at least one embodiment, the disk-shaped filter elements 150, 152 are slidably mounted in the axial direction and configured to move axially between the inlet flow tube 134 and outlet flow tube 146. The disk-shaped filter elements 150, 152 may also be clamped axially against the outlet flow tube 146.

Figure 6:
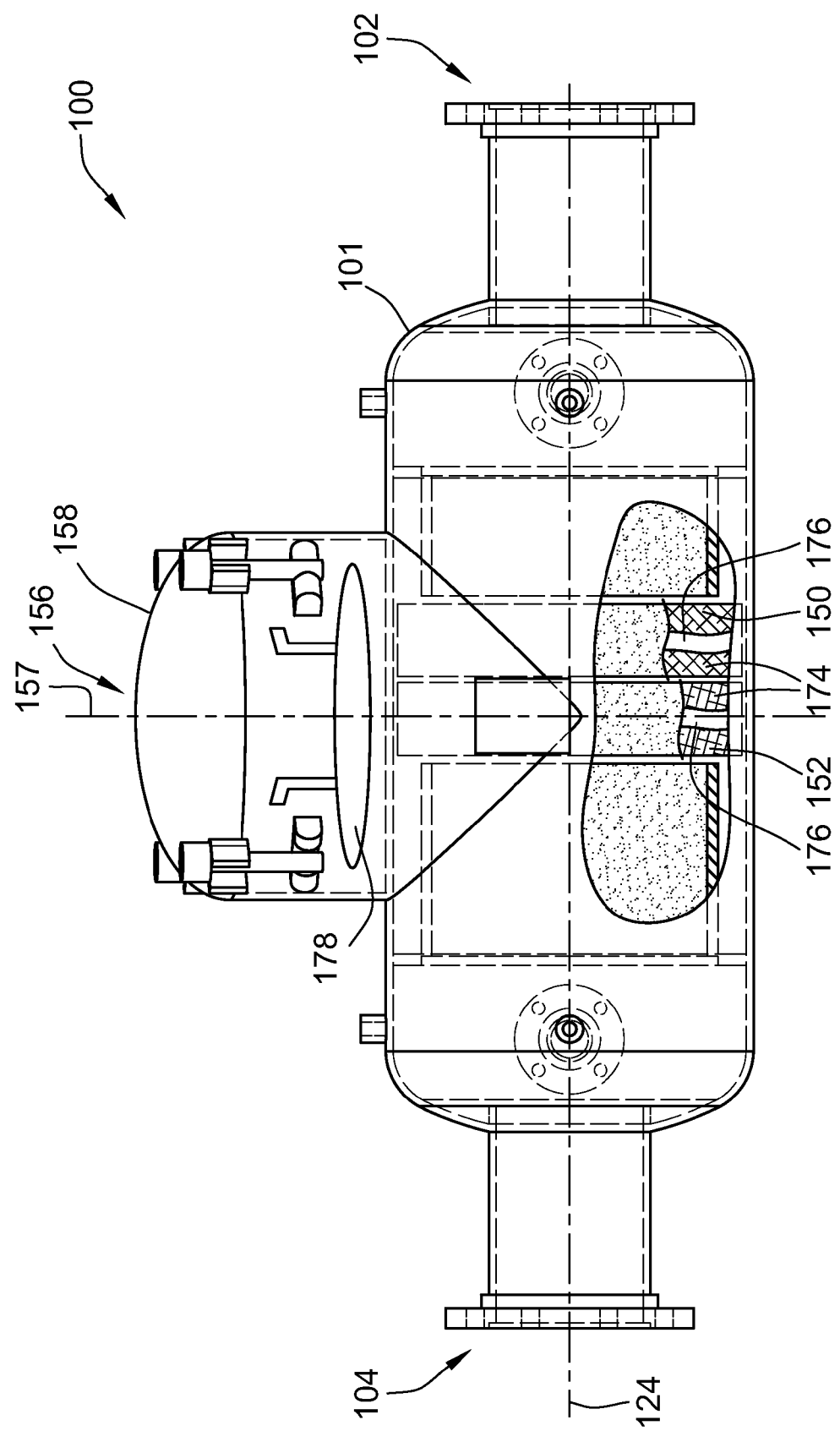
FIG. 6 is a top view of the filtration system with a cutout to show some interior components of the filtration system, according to an embodiment of the invention.

FIG. 6 is a top view of the pressure vessel 101, and shows an embodiment of the invention in which the disk-shaped filter elements 150, 152 are enclosed in porous bags 174, wherein the porous bags 174 includes a handle 176 that is typically made of nylon or a like strapping material secured to the porous bags 174. The porous bags 174 are configured with a very open material, typically cotton, such that the flow of gas through the disk-shaped filter elements 150, 152 will not be noticeably impeded. In other words, surface loading on the bags is generally not desirable in a preferred embodiment. For example, open netting may be used as material for the porous bags 174. However, handling of the disk-shaped filter elements 150, 152 at installation or removal will be made much easier by the inclusion of the handle 176 on the porous bags 174. In the embodiment shown, the handle 176 encircles the outer circumferential surfaces 175, 181 (in FIG. 10A) of the disk-shaped filter elements 150, 152. FIG. 6 also show a compression plate 178 attached to the access port door 158. The compression plate 178 is configured to limit the radial movement of the disk-shaped filter elements 150, 152 within the pressure vessel 101. In an embodiment, the compression plate 178 is circular and is attached to the access port door 158 at four points equally spaced about the perimeter of the compression plate 178.

Figure 7:
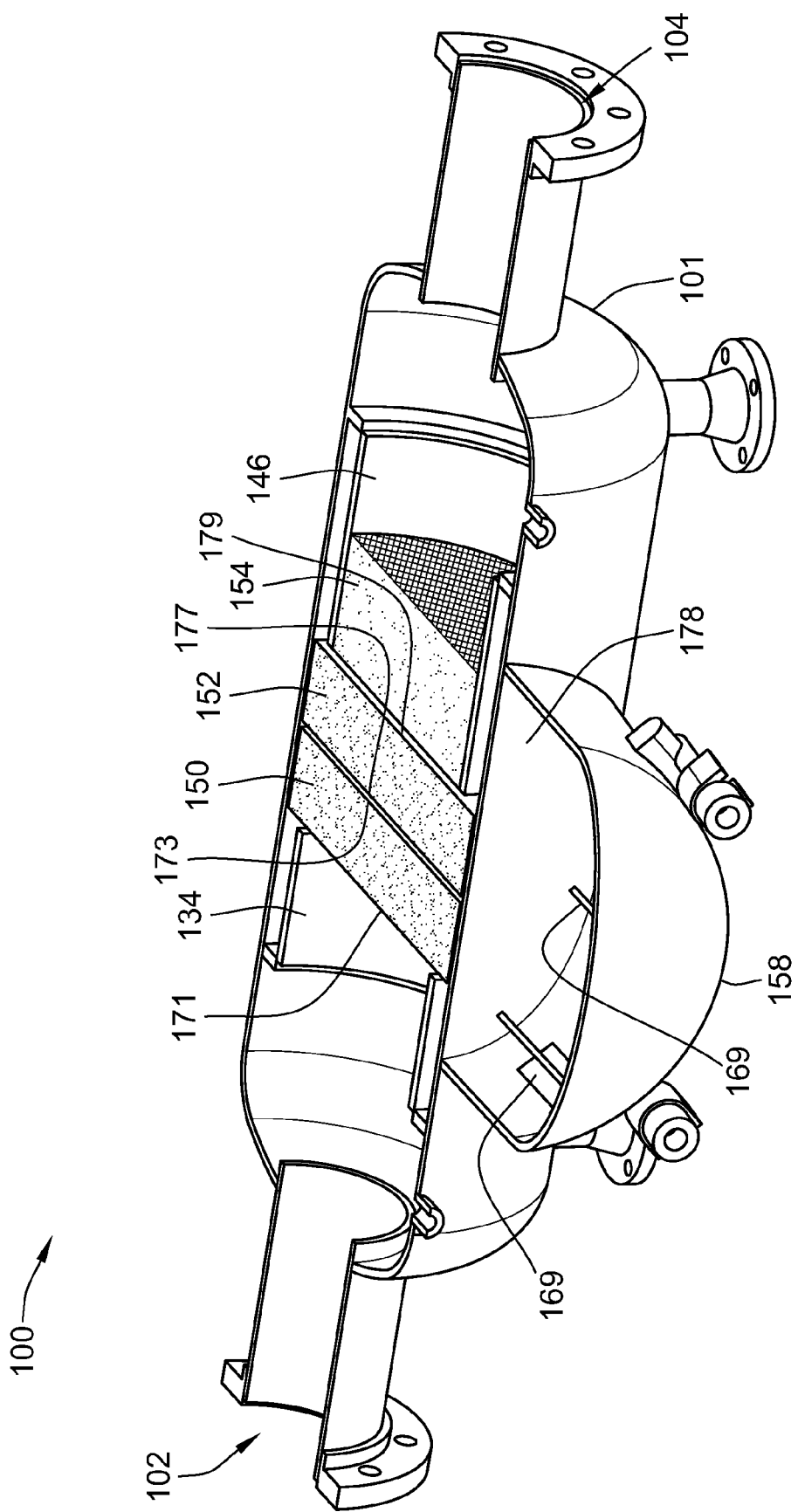
FIG. 7 is a cross-sectional view of the filtration system, according to an embodiment of the invention.

FIG. 7 shows a sectional view of the pressure vessel 101 that further illustrates the relation between the disk-shaped filter elements 150, 152, the wire mesh mist extractor 154, the inlet flow tube 134, the outlet flow tube 146, the compression plate 178, and the pressure vessel 101. In an embodiment of the invention, the compression plate 178 is attached to access port door 158 by a plurality of clamps 169. In the embodiment of FIG. 7, four clamps 169 secure the compression plate 178 to the access port door 158. In at least one embodiment, the clamps 169 are adjustable so that the position of the compression plate 178 can be changed. However, in an embodiment, the clamps 169 are configured to rigidly fix the position of the compression plate 178 in the presence of high-pressure natural gas flows. The compression plate 178 notwithstanding, the configuration of the disk-shaped filter elements 150, 152 in the pressure vessel 101 is one where substantially the entire surface of the disk-shaped filter elements 150, 152 including outer peripheral surfaces 175, 181, axially upstream surfaces 171, 177, and axially downstream surfaces 173, 179 are largely unobstructed, and thereby configured to maximize the flow of natural gas through the disk-shaped filter elements 150, 152.

Figure 9:
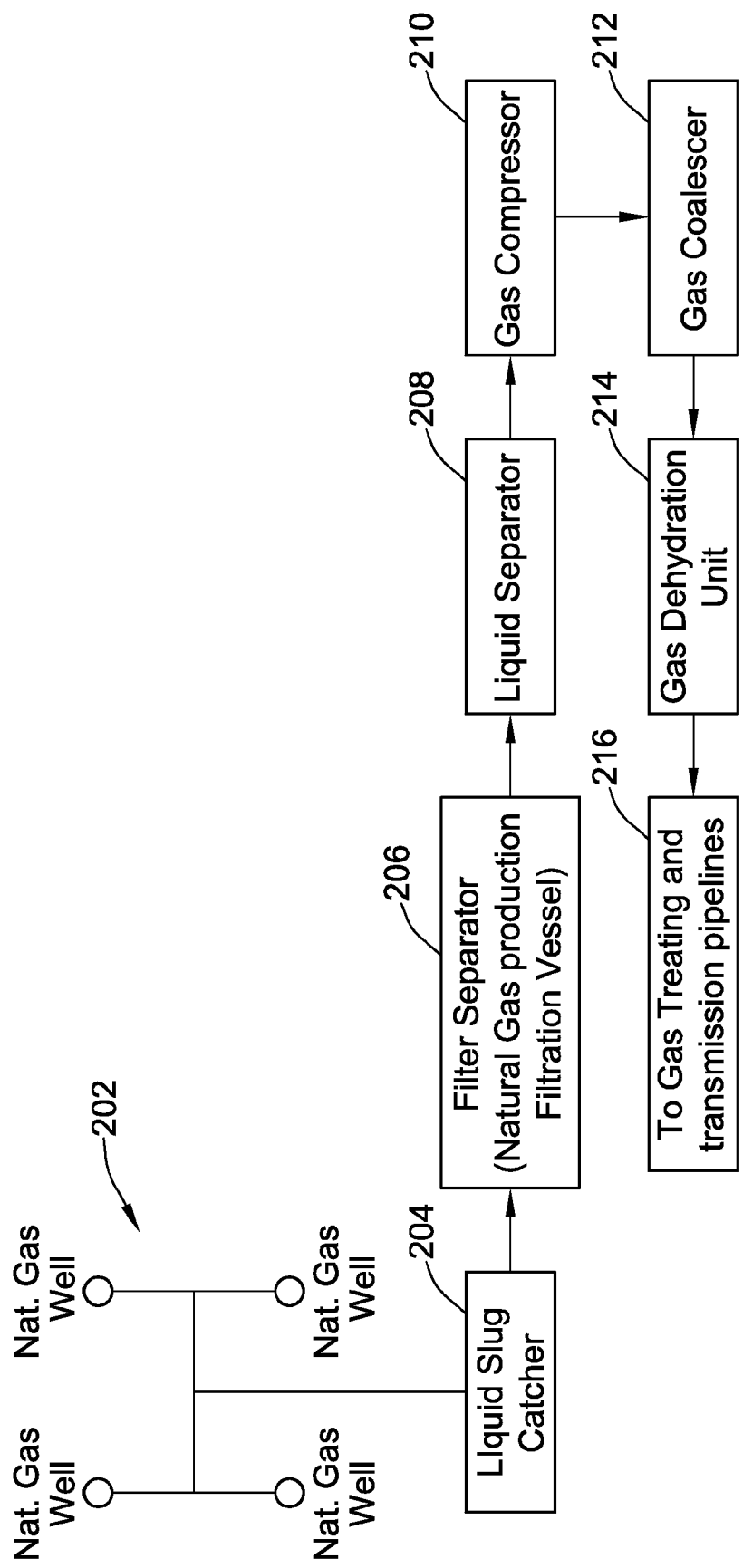
FIG. 9 is a block diagram illustrating a typical flow path for natural gas from the well to distribution.

The typical production environment in which filtrations systems that include pressure vessel 101 may be used to filter natural gas, for example, are represented in the block diagram of FIG. 9. Natural gas is extracted from a well 202 and the gas is initially passed through a liquid slug catcher 204. From the liquid slug catcher 204, the natural gas is routed to a filtration system 206 having a pressure vessel 101 with an inlet 102 and outlet 104, the pressure vessel housing disk-shaped filter elements 150, 152, an inlet flow tube 134, an outlet flow tube 146, and an option wire mesh mist extractor 154. From the filtration system 206, the natural gas is routed to a liquid separator 208, then to a gas compressor 210, and on to a gas coalescer 212. From the gas coalescer 212, the natural gas is routed to a gas dehydration unit 214, and from there to additional gas treating and transmission pipelines 216.

The proper functioning of the filtration system 206 is important because the presence of too much liquid in the natural gas stream may degrade and lead to increased maintenance for the gas compressor 210, gas coalescer 212, and the gas dehydration unit 214.

General Characteristics of Preferred Filter Medias

Fluid streams, such as liquid flows and gaseous flows (e.g. air flows), often carry undesirable contaminants entrained in the fluid stream. Filtration systems are commonly employed to remove some or all of the particulates from the fluid stream. For example, natural gas filtration systems are used to filter natural gas streams for a wide variety of liquid and solid contaminants. Examples of such contaminants include, but are not limited to coal dust, salt deposits, sand, oil and water.

One common parameter used to characterize almost all types of filter media is the "efficiency" of the filter media. Efficiency is the propensity of the media to trap particulates as opposed to allowing the particulates to not be filtered and instead pass through the media. Another common characteristic is pressure drop across the media, which is typically related to the porosity of the media. The pressure drop across the media relates to how restrictive the filter media is to fluid flow. Larger pore sizes typically have allowed for greater fluid flow, but also typically result in more particulates being passed through, i.e., lower efficiency. As a result, the efficiency of a media tends to have a proportional relationship to the pressure drop across the media. In particular, while it is often desirable to trap a large amount of particulates, providing such a high efficiency often has the undesirable effect of increasing the restrictiveness of the media and therefore the pressure drop across the media.

Efficiency often refers to the initial efficiency, that is the efficiency of the filter media post manufacture but prior to usage and prior to loading with particulates. During use, filter media traps particulates, typically as a layer on the surface of, or within, the media. These filtered-out particulates plug the larger holes in the media thereby preventing holes for smaller particles to pass and thereby increases the efficiency of the media over time to an operating efficiency greater than the initial efficiency. However, by plugging fluid flow paths, such filtered out particulates also eliminate or partially clog a fluid passageway and thereby increase the pressure drop across the media making it more restrictive to fluid flow.

Usually, filter lifespan is determined by the pressure drop across the filter. As more and more particles are filtered out of the fluid flow and trapped by the filter media, the filter media becomes more restrictive to fluid flow. As a result, the pressure drop across the filter media becomes higher. Eventually, the media becomes too restrictive, resulting in insufficient amount of fluid flow for the needs of the given application. Filter change intervals are calculated to coincide approximately with such an event (e.g. prior to reaching an insufficient fluid flow situation). Filter change intervals may also be determined through sensors that measure pressure drop load across the media.

One problem with particulate surface layer formation, in the case of surface loading filtration, is that particulates can rapidly build up and quickly limit the lifespan of the filter. As a result, the filter media in some applications may be pleated, fluted or otherwise constructed in a similarly bunched up manner to increase the amount of filter media surface area available within the frame supporting the filter media.

Filter medias can be characterized as surface loading media (a.k.a. barrier filtration), and depth media, but that characterization in part depends upon the dust particle size. For example, depth loading media can surface load large debris and/or larger particles for example. However, surface loading media generally traps particles only on the surface of the media in a very thin layer in what is sometimes referred to as a filter cake. Often the filter cake layer forms as a thin skin over the filter media, which can be peeled away usually with relatively light mechanical force. In some applications such as reverse pulse applications, the filter cake is automatically blasted off the filter media surface via a reverse pulse blast of air (or other application of mechanical force) and collected in a waste receptacle. Often times, the filter is simply replaced after sufficient filter cake buildup. Depth media on the other hand works through the thickness of the media to trap particles internally within the "depth" of the media. Depth media is loaded with particulates throughout the volume or depth occupied by the media.

In many filter media applications, and particularly high-flow-rate applications, a depth-loading media is chosen. Typically, depth-loading media comprises a relatively thick tangled collection of fiber material. A conventional depth-loading media filter is a deep (measured from inlet to outlet, compared to surface-loading media) and substantially constant-density media. Specifically, the density of the depth-loading media remains substantially constant throughout its thickness but for minor fluctuations in density as may be caused, for example, by compression and/or stretching around peripheral regions due to mounting of the media and the like. Gradient density depth-loading media arrangements are also known in which the density of the media varies according to a designed gradient. Different regions having different media density, porosity, efficiency and/or other characteristics can be provided over the depth and volume of the depth-loading media.

Depth-loading media is often characterized in terms of its porosity, density and solids content percentage. For example, a 5% solidity media means that about 5% of the overall volume comprises solids (e.g. fibrous materials) and the remainder is void space that is filled by air or other fluid. Another commonly used depth media characteristic is fiber diameter. Generally smaller diameter fibers for a given solidity percentage will cause the filter media to become more efficient with the ability to trap smaller particles. Smaller fibers can be packed together in greater numbers without increasing the overall solidity percentage, given the fact that smaller fibers take up less volume than larger fibers.

Because depth-loading media traps particulates substantially throughout the volume or depth, such media can be loaded with a higher weight and volume of particulates as compared with surface-loading medias over the lifespan of the filter. However, depth-loading medias tend to have lower efficiencies than surface-loading medias. To facilitate such high loading capacity, a low-solidity depth-loading media is often chosen for use. This may result in a large average pore size, which have the potential to allow some particulates to pass more readily through the filter. Gradient density systems and/or adding a surface-loading media layer can provide for improved efficiency characteristics. For example, a surface-loading media layer can be arranged in combination, for example, on the downstream surface of a depth-loading medium (or between upstream and downstream faces) to increase efficiency.

Figure 13:
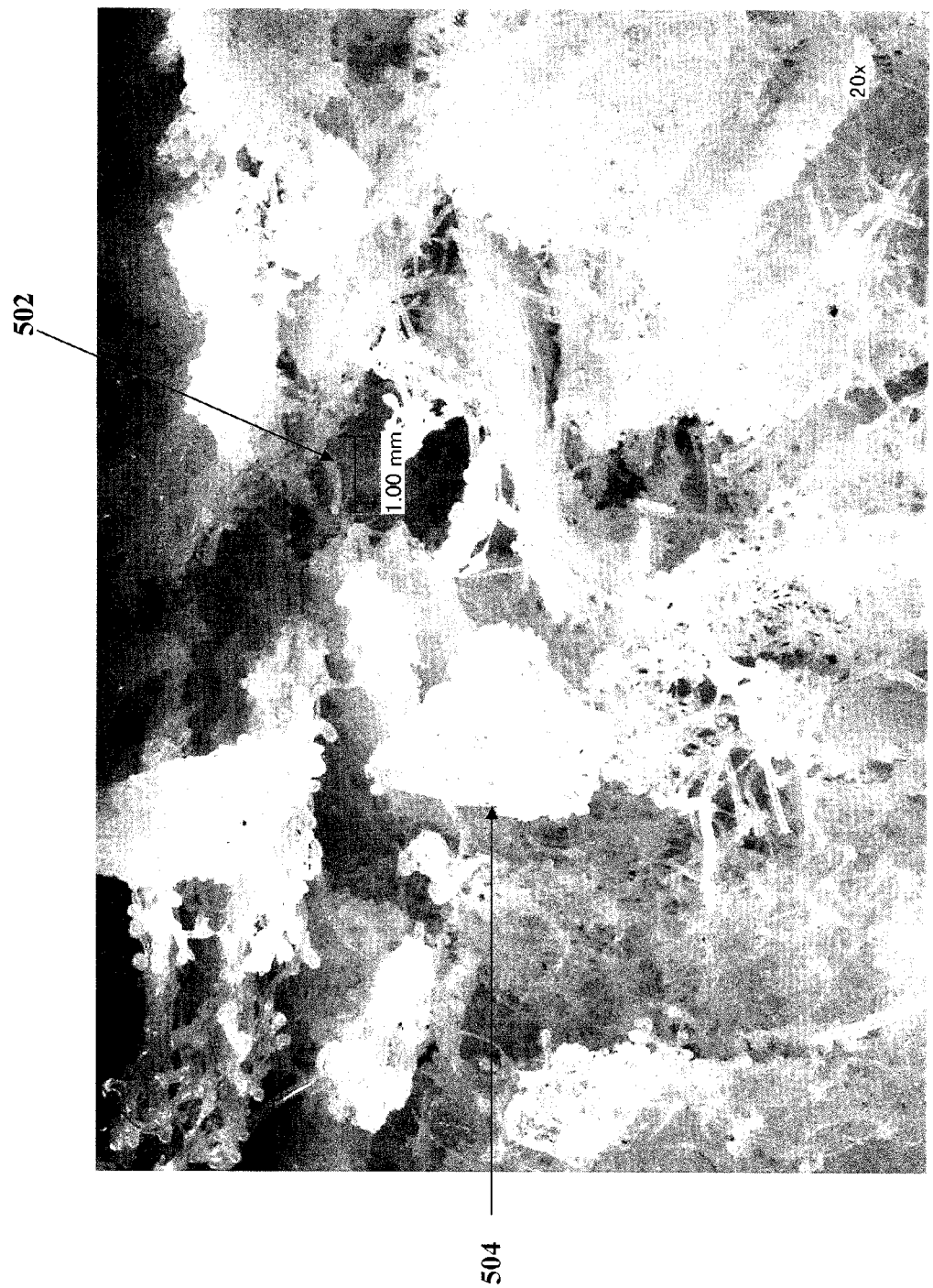
FIG. 13 is a microscopic image at 20 times magnification of a filter media constructed in accordance with an embodiment of the invention.
Figure 14:
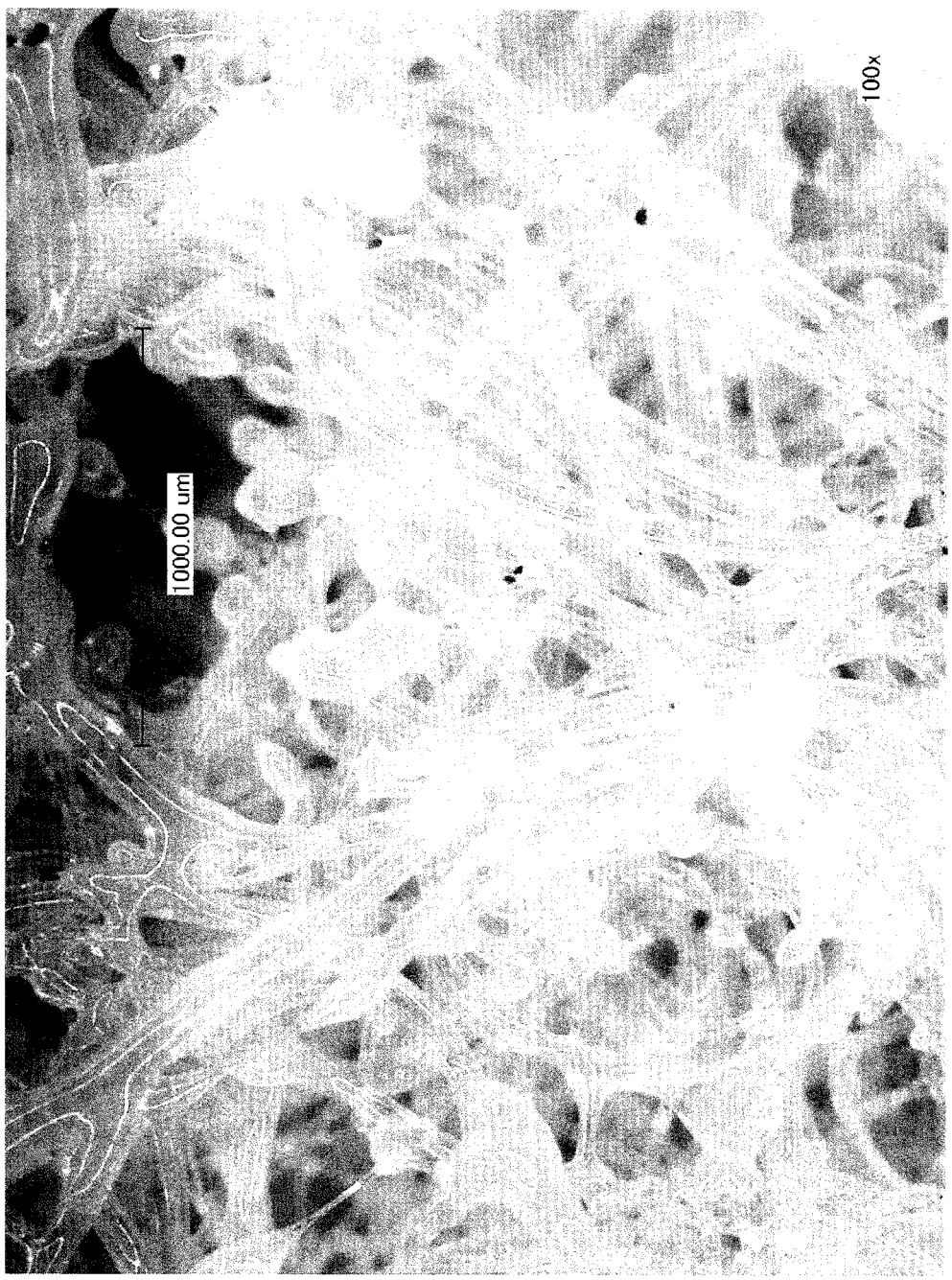
FIG. 14 is a microscopic image at 100 times magnification of the filter media of FIG. 13.

Turning now to FIGS. 13 and 14, new combination axial and radial flow filter elements and medias therein are employed. In viewing the microscopic image of an exemplary depth-loading filter media shown in FIG. 13 at 20 times magnification, a couple of observations can be made about selections of medias for various embodiments. First, it should be noted that the structure of the filter media is formed by chips or chunks of synthetic polymeric fibrous material or media. The fibers are bonded together to form a matrix of entangled fibers that, in at least one embodiment, have a mean fiber diameter between 10 and 110 microns. The fibers are bonded together at junctures between fibers, and wherein the chips are directly bonded together at contact locations between adjacent chips. The bonds between the chips or chunks of media define a macro-pore structure, where the macro-pore size generally ranges from 500 microns to as much as 10,000 microns. One macro-pore 502 illustrated in FIG. 13 has an average size of approximately 1,000 microns, or 1 millimeter. Within each of the chunks of fibrous media, there is a micro-pore structure, where the micro-pore size generally ranges from 10 microns to 100 microns.

In an embodiment of the invention, the combination of a macro-pore and micro-pore structure within a filter media allows for effective depth-loading substantially throughout the entire thickness of the filter element. As described herein, it is possible that the thickness may exceed ten inches for some disk-shaped filter elements. The macro-pores allow both large and small particulates and liquids to penetrate into the depths of the media, while the micro-pores eventually trap and hold the particulates and coalesces the liquids for extraction. An example of these micro-pores is shown within the chunk of fibrous media 504 indicated in FIG. 13. The combination of micro-pores and macro-pores in the structure of the disk-shaped filter elements 150, 152 is configured to provide a relatively high filter efficiency at higher flux rates than would be possible in most conventional filtration systems.

In one embodiment, the filter medium may be made from chunks of PEACH filter media, such as that available from the present assignee, Perry Equipment Co. (PECO), and as may be discussed in U.S. Pat. No. 5,827,430. PEACH media consists of multiple layered sections of media formed into a conical helix pattern. The PEACH media is made of polyester or polypropylene thermally bonded in an air laid process, then formed into a compressed filter media sheet, and spirally wound. Unlike most tubular filter cartridges, the aforementioned disk-shaped filter elements are substantially sold filter elements, thus providing a greater amount of filter media per unit volume than typical cartridge-type filter elements. FIG. 14 is a microscopic image of the exemplary depth-loading filter media of FIG. 13 at 100 times magnification that also shows a macro-pore of approximately 1,000 microns. However, the increased magnification also provides some evidence of the heat-bonding used in the manufacturing process used to produce the integrated macro-pore and micro-pore structures of the filter media described herein. In one embodiment of the invention, the waste stream from the production of a fibrous synthetic polymeric filter media, such as polyester from the production waste stream of PEACH filter elements for example, is ground into small chunks Typically, the chunks have an average diameter between 0.25 and 0.75 inches.

Other polymeric fibrous materials suitable for this process include, but are not limited to polypropylene or fiberglass supported by a more structurally rigid material. The ground chunks of fibrous media are placed in a mold, for example a disk-shaped mold, and subjected to elevated pressure and elevated temperature of approximately 420 degrees Fahrenheit. For most polymeric materials, including alternatives to polyester that may be used, the temperature will be between 250 and 600 degrees Fahrenheit. More specifically, the temperature range suitable for this process is from 400 to 420 degrees Fahrenheit. This process results in a depth-loading media with good efficiency at high flux rates, which may be significantly less expensive to manufacture and install than conventional cartridge-type filter elements.

As can be seen from FIG. 14, the elevated temperature causes the fibers to melt and causes the chunks of fibrous material to bond together, and also further bonds and partially melts the fibers of the fiber entanglement, thus changing the micro-pore structure. The macro-pore size and micro-pore size can be partially controlled by the amount of pressure applied to the fibrous media during production. For example, at high compression, typically from 1.5 to 2.5 psi, the resulting filter media would be configured to remove particles with average size of 10 microns with 90% efficiency at the rated capacity of the system. At low compression, typically from 0.25 to 1 psi, the resulting filter media would be configured to remove particles with average size of 50 microns with 90% efficiency at the rated capacity of the system. In an alternate embodiment of the invention, the fibrous chunks of filter media are resin-bonded or solvent-bonded rather than heat-bonded. In this alternate embodiment, a resin, adhesive, bonding agent, volatile solvent or the like is used to create the direct bonds at contact locations between adjacent chips. Another alternate embodiment of the invention includes the addition of 5 to 15 wt % virgin bi-component fibers to the filter media. The virgin bi-component fibers would be used to add strength to the filter disk media without the addition of resins or other bonding agents.

However, alternate embodiments of the invention are contemplated in which the filter medium has an axial thickness of at least one inch with a particle capture rating selected between five microns and 150 microns, at rated flow capacity, with an at least 90% particle capture efficiency. Further, the filter medium is configured to coalesce at least 50% of liquids entrained in a fluid flow, at rated flow capacity. In yet another embodiment, multiple layers of filter disk can be adhered together to increase the media's dirt holding capacity and strength. The radial flow aspect of the filter disk will hold the removal efficiency and pressure drop at a constant even through additional media is used.

Embodiments of the filter medium of either of the disk-shaped filter elements 150, 152 with a thickness of 102 millimeters typically have a basis weight between 40 and 200 kilograms per cubic meter. These embodiments typically have a pore size distribution wherein at least 70% of the pores have an average diameter between 10 and 1,000 microns, a solidity between 30 and 70%, and remaining void space between 70 and 30%.

Figure 10A:
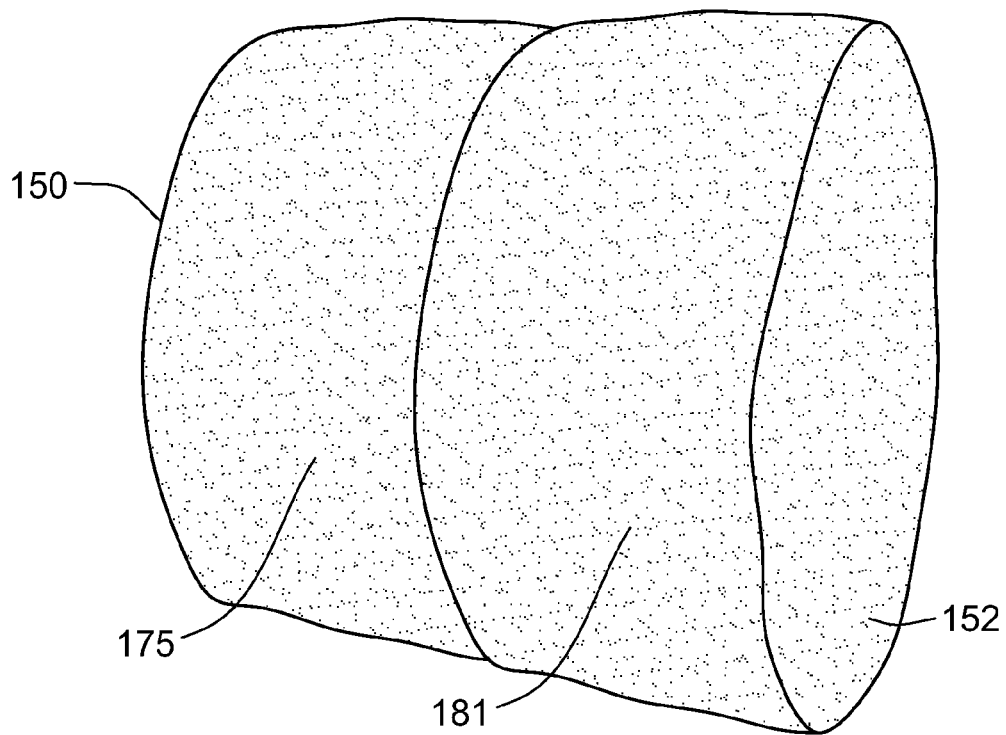
FIG. 10A is a perspective view of disk-shaped filter elements, according to an embodiment of the invention.

Referring now to FIG. 10A, it should be noted that the process for manufacturing the filter media described above is configured to produce a disk-shaped filter element, wherein the porous chips are bonded together to form a self-supporting filter medium that does not need any type of housing, frame, or other support structure. Further, the filter medium is configured to maintain its shape when subjected to a pressure differential of at least 50 psi, and, more typically, between 10 and 20 psi. Furthermore, in an embodiment of the invention, the disk-shaped filter elements 150, 152 do not require a seal or gasket when used in the filtration system described herein. However, it is contemplated that, in at least one embodiment of the invention, a seal may be used with a disk-shaped filter element to increase the efficiency of the filtration system.

The disk-shaped filter elements 150, 152 can be manufactured in various sizes, for example having diameter ranging from at least 4 inches up to 64 inches, and having axial thicknesses of at least 1 inch to thicknesses in excess of 10 inches. Referring to FIG. 7, in at least one embodiment, the disk-shaped filter element 150 has an axial upstream 171 surface and an axial downstream surface 173, with an outer peripheral, or outer circumferential, surface 175 (in FIG. 10A) extending therebetween. The disk-shaped filter element 152 has an axial upstream 177 surface and an axial downstream surface 179, with an outer circumferential surface 181 (in FIG. 10A) extending therebetween. The disk-shaped filter elements 150, 152 have a maximum width normal to the axial thicknesses of the filter elements 150, 152 of at least 3.5 inches. In at least one embodiment, the porous chips of fibers are bonded together, wherein the micro-pore structure has an average porosity of less than 0.10 millimeter formed within the porous chips, but typically between 0.01 and 0.05 millimeter, and wherein the macro-pore structure has an average porosity greater than 0.5 millimeter formed between adjacent chips, but typically between 0.75 and 1.25 millimeters.

In an embodiment of the invention, the disk-shaped filter elements 150, 152 are between 17 and 19 inches in diameter, with an axial thickness between 3 and 6 inches. Typically, the disk-shaped filter elements 150, 152 are sized such that, when installed in the pressure vessel 101, there is an average clearance ranging from ¼ inch to one inch between the outer peripheral surfaces 175, 181 of the disk-shaped filter elements 150, 152 and the interior surface 140 of the pressure vessel 101. Thus the disk-shaped filter elements 150, 152 utilize at least 90% of the cross-sectional area and diameter of the pressure vessel 101 housing. That clearance allows for a flow of natural gas around the edges of the disk-shaped filter elements 150, 152. The clearance also allows the disk-shaped filter elements 150, 152 to move axially between the inlet flow tube 134 and the outlet flow tube 146. Further, the clearance provides for easy installation of the disk-shaped filter elements 150, 152. For example, the filtration system operator may simply open the access port 156 and roll the disk-shaped filter elements 150, 152 into place.

Figure 8:
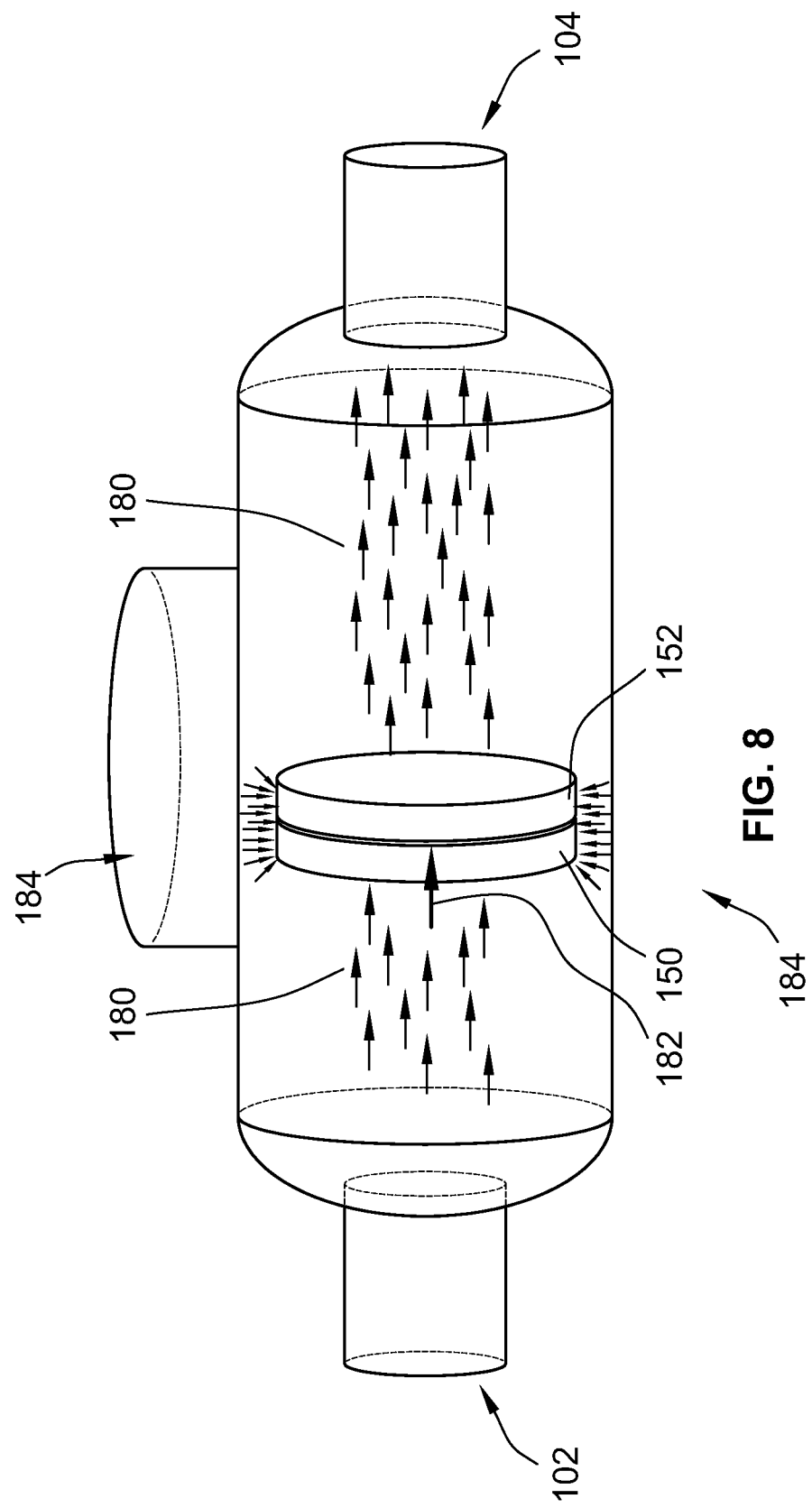
FIG. 8 is a view of the filtration system showing an exemplary flow path of natural gas through the filtration system.

FIG. 8 provides an exemplary illustration of the flow of natural gas through the pressure vessel 101 and through the disk-shaped filter elements 150, 152. For illustrative purposes, the amount of space between the outer peripheral surfaces 175, 181 (in FIG. 10A) of the disk-shaped filter elements 150, 152 and the interior surface 140 (in FIG. 1) of the pressure vessel 101 has been exaggerated. A natural gas stream 180 enters the pressure vessel 101 at the inlet 102. A portion of the natural gas stream 180 flows through the disk-shaped filter elements 150, 152 in the direction shown by arrow 182. Another portion of the natural gas stream 180 flows around the edges 184 of the disk-shaped filter elements 150, 152. As a result of the flow axially through and around the edges 184 of the disk-shaped filter elements 150, 152, the disk-shaped filter elements 150, 152 experience contaminant loading both axially and radially inward.

As mentioned above, the clearance between the disk-shaped filter elements 150, 152 and the interior surface 140 of the pressure vessel 101 allows for axial movement of the disk-shaped filter elements 150, 152. The pressure created by the axial flow of the natural gas stream 180 through the inlet flow tube 134 causes the disk-shaped filter elements 150, 152 to move axially into a position abutting the outlet flow tube 146. The axial flow of gas also forces the axial surfaces of the disk-shaped filter elements 150, 152 together into sealing engagement with each other.

In an embodiment of the invention, a downstream axial face 179 (in FIG. 7) abuts and forms and integral seal against the end of flow tube 146 (in FIG. 5), wherein the seal is directly to the filter media axial face 179 (through the porous bags 174, if any). The seal ensures that natural gas does not flow from outlet 104 without first flowing through the disk-shaped filter elements 150, 152.

Figure 11:
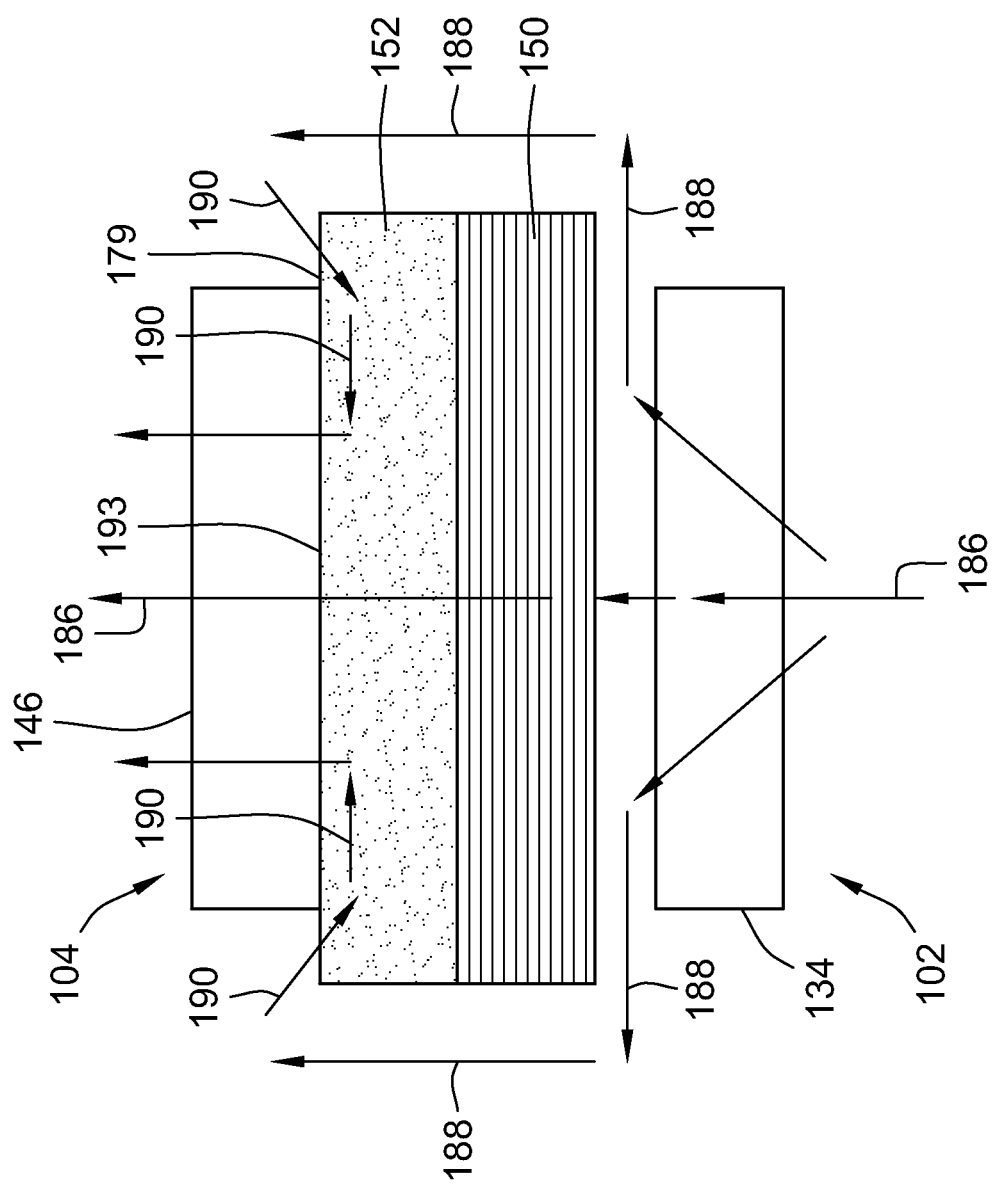
FIG. 11 is a block diagram illustrating the flow of natural gas through and around the disk-shaped filter elements.

FIG. 11 is a block diagram showing the flow path of natural gas through the disk-shaped filter elements 150, 152. A portion of the natural gas stream shown by arrow 186 flows towards the center of the disk-shaped filter elements 150, 152 to facilitate axial loading of the disk-shaped filter elements 150, 152 as that portion of the natural gas stream shown by arrow 186 flows from the inlet 102 to the outlet 104. Another portion of the natural gas stream shown by the arrows 188 flows around the edges and through the outer peripheral surface 140 of the disk-shaped filter elements 150, 152. The portion of the natural gas stream shown by arrows 188 facilitates the radial loading of the disk-shaped filter elements 150, 152 in the direction shown by arrow 190 before the natural gas stream flows from the outlet 104.

As mentioned above, the pressure from the axial flow of the natural gas stream shown by arrow 186 causes the disk-shaped filter elements 150, 152 to move axially towards the outlet 104, such that the downstream axial surface 179 of the disk-shaped filter element 152 seals against an upstream axial surface of the outlet flow tube 146, wherein the downstream axial surface 179 integrally includes an annular congruent sealing surface for sealing against the outlet flow tube 146, and the disk-shaped filter element 152 is sufficiently resilient to cause the disk-shaped filter element 152 to seat in sealing relation with the edge of the outlet flow tube 146.

Figure 12:
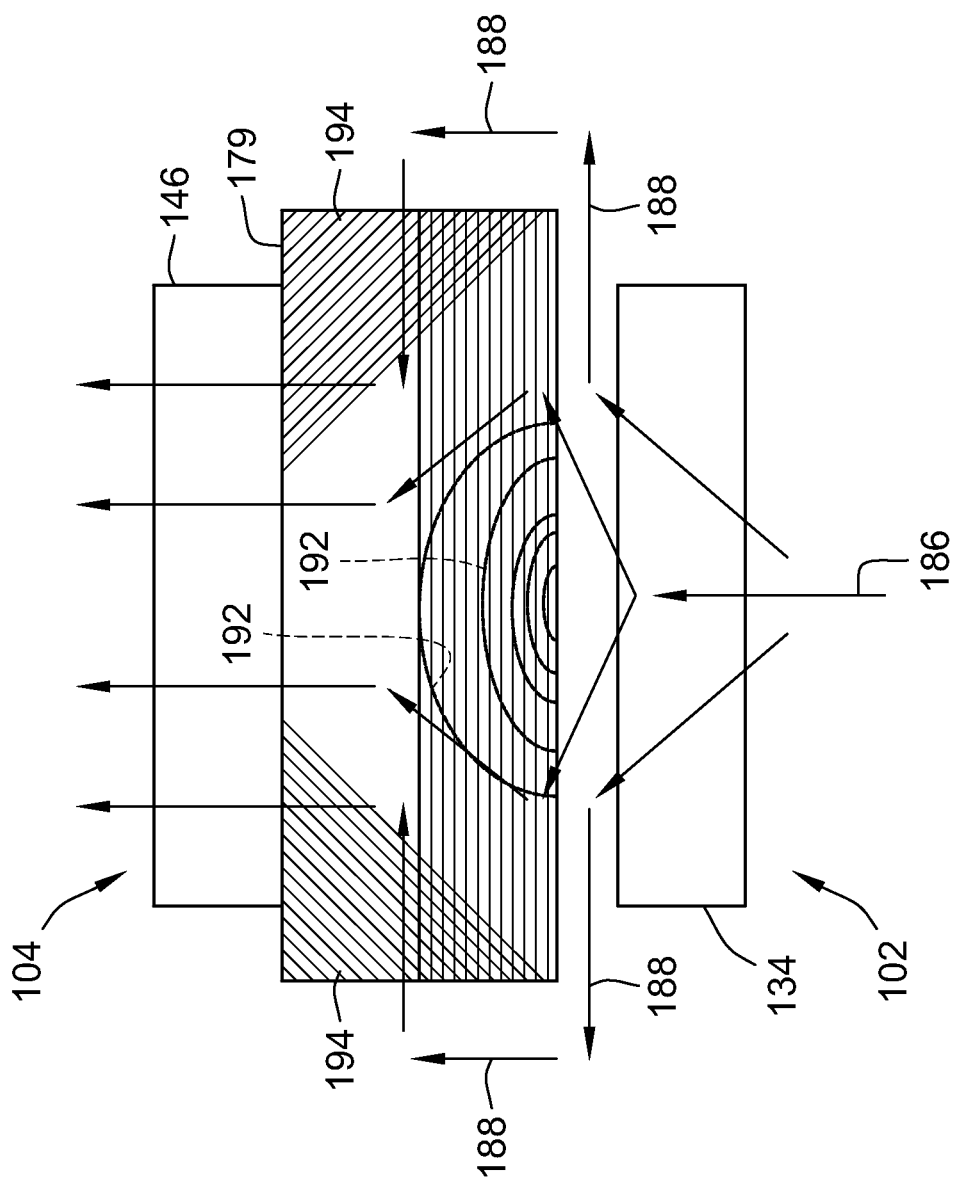
FIG. 12 is a block diagram illustrating the axial and radial loading of the disk-shaped filter elements.

FIG. 12 is a block diagram further illustrating both the axial and radial loading of the disk-shaped filter elements 150, 152. A series of arcuate lines 192 represents the axial loading of disk-shaped filter elements 150 that results from that portion of the natural gas stream shown by arrow 186. A series of parallel lines 194 represents the radial loading of disk-shaped filter elements 150, 152, which starts at the downstream axial surface 179 of the disk-shaped filter element 152 and progresses radially inward at an angle towards the downstream axial surface 179 of the disk-shaped filter element 150.

Figure 10B:
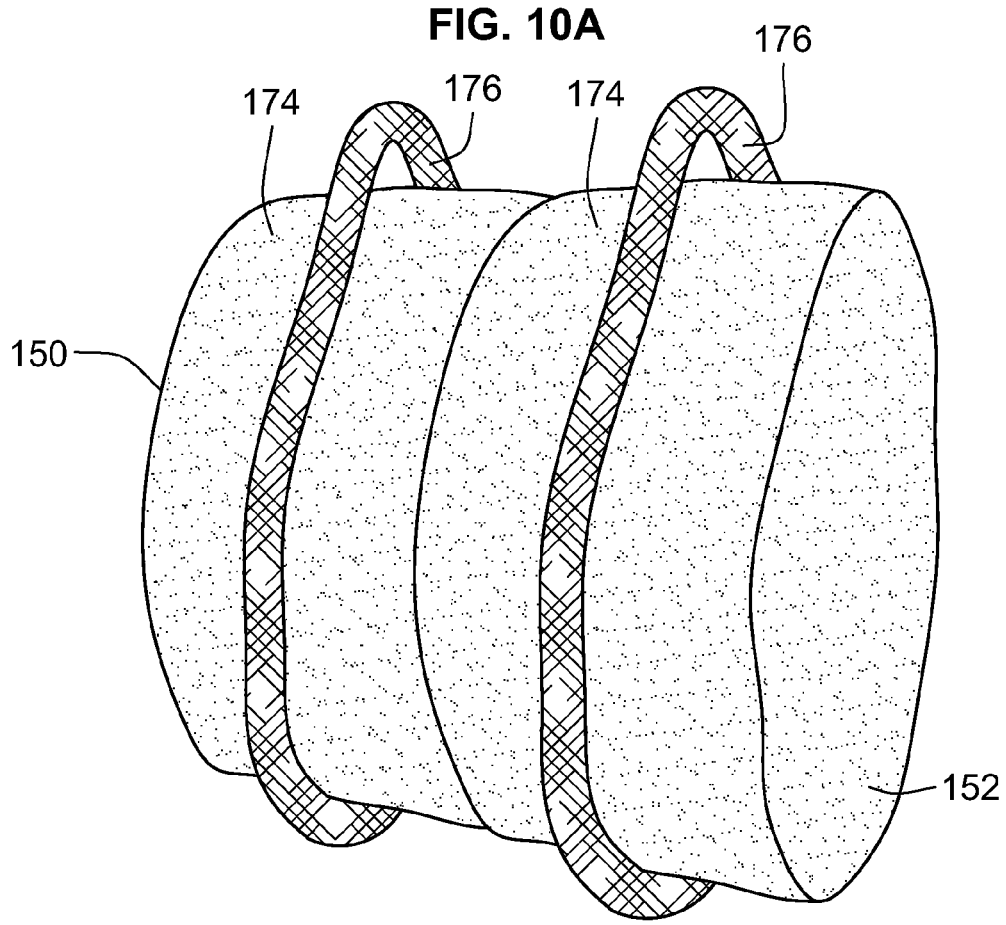
FIG. 10B is a perspective view of disk-shaped filter elements surrounded by porous bags, according to an embodiment of the invention.

FIG. 10B shows an embodiment in which the disk-shaped filter elements 150, 152 are surrounded by porous bags 174. The porous bags 174 may be made of a mesh material, cotton for example, having large gaps or holes that allow for a natural gas stream to flow through the filter media inside the mesh bag 174. Alternatively, the porous bag could be made of nylon, or some similar material, which would allow a flow of natural gas through the material without causing a significant pressure drop. In an embodiment of the invention, the porous bags 174 includes the handle 176. In at least one embodiment, the handle 176 is made from the same material as the porous bag 174. The handle 176 is configured to facilitate manual installation and removal of the disk-shaped filter elements 150, 152 without the aid of tools or fixtures. In this manner, the time required to replace filter elements is reduced and the process is simplified, thus reducing maintenance cost and downtime.

The design of the pressure vessel 101 and the disk-shaped filter elements 150, 152 simplifies the installation and removal of the disk-shaped filter elements 150, 152 due to the access port 156 which facilitates radial loading of the disk-shaped filter elements 150, 152. That is, the disk-shaped filter elements 150, 152 are installed and removed from the pressure vessel via the radial access provided by the side-mounted access port 156. The ability to essentially roll replacement disk-shaped filter elements 150, 152 into place radially simplifies maintenance procedures, reduces operational costs and downtime for routine maintenance, as compared to conventional filtration systems with axial-loading filter elements where special tools, fixturing, or even heavy equipment, such as a forklift, may be required to properly execute a filter element change. Further, the combination of the porous bag 174 with handle 176 and the large access port 156 allows the filtration system operator to manipulate and radially load a fairly large disk-shaped filter element with one hand with less difficulty than generally required for the loading of a conventional cartridge-type filter element.

EXAMPLES

A filter media sample, manufactured in accordance with an embodiment of the invention, that included a filter element and a coalescer element was installed in a GPXT-20-175-8 pressure vessel having a 20-inch-diameter body with eight inch flanges spaced 66⅝ inches face to face. Both the filter element and the coalescer element were 18.8 inches in diameter, four inches thick, had a dry weight of five pounds, and a wet weight of 10 pounds. The target liquid efficiency was 70% of HC at the max flow rate. When tested with a coalescer disk having a larger average pore size, the target solids efficiency was 90% for 50 micron particles with a 2.5 psid pressure drop across the filter media. When tested with a coalescer disk having a smaller average pore size, the target solids efficiency was 90% for 10 micron particles with a 5 psid pressure drop across the filter media.

A test of the solid dirt-loading capacity for a filter element and a coalescer element yielded a solids capacity of 32 pounds of coarse dust. The solids challenge was performed according to the ISO 12103-1 A4 using AC Coarse Test Dust and yielded the following results:

| | |
|---|---|
| Solids Challenge: | ISO 12103-1 A4 |
| Solids Distribution Mean Particle Size | 50 microns |
| Dirt Holding Capacity Density | 24.74 lbs./cu. ft. of disk media |
| Test Dir Loading Capacity for (2) 4" thk × 18.8" disks | 32 lbs. |
| Disk Average Solids Removal Rating (Clean): | 50 microns |

A volumetric efficiency test was performed at the Perry Equipment Corporation (PECO) Air Lab on a filter disk/coalescer disk combination, designated as FD/CD5.2. The filter elements were housed in a pressure vessel having a 8.25 inch interior diameter with a 5.2 inch interior diameter riser. The test was performed according to Standard Protocol No. Air_SOP and included the following input values, calculations and test notes:

| Input Values | |
|---|---|
| Vessel Flow Rate (SCFM) | 300 |
| Vessel Pressure (PSIG) | 5.5 |
| Vessel Temperature (° F.) | 85 |
| Specific Gravity | 1 |

| Input Values | |
|---|---|
| Flow Tube ID (inches) | 5.2 |
| Liquid Density (lbs./ft$^3$) | 51.9 |

| Calculations | |
|---|---|
| Compressibility | 1.000 |
| Flow Rate (ACFM) | 229 |
| Gas density (lbs./ft$^3$) | 0.100 |
| X-Sec Area (ft$^2$) | 0.147 |
| Flow Tube Velocity (ft/sec) | 25.9 |

| Test Notes | |
|---|---|
| Test Liquid | Generator Oil |
| Atmospheric Pressure | 14.65 |
| Sampling Period | 3.15 |
| Sampling Duration (min.) | 60 |
| Dry DP (WC) | 29 |
| Wet DP (WC) | 32 |
| Avg. Liquid Injection Rate (mil/min) | 30.00 |
| Total Volume of Liquid Injected | 1783 |
| Total Volume of Liquid Collected | 1410 |

According to the volumetric efficiency test, the test sample had a volumetric efficiency of 79%. Volumetric efficiency is calculated by dividing the volume of the liquid collected by the filter by the volume of liquid that challenged the filter multiplied by 100.

Testing Methodologies

For the examples and discussion above some attention will be given to test methodologies that were used for evaluating the depth-loading filter media. For the testing results set forth herein, an ISO 12103-1 A4 methodology was used employing AC Coarse Test Dust, which is available from Reade Advanced Materials of Reno, Nev. The test samples consisted of a filter disk in combination with a coalescer disk, wherein each disk was approximately 8 inches in diameter with an axial thickness of about four inches.

The volumetric efficiency test was performed using an air coalescer test stand, and a horizontally-oriented pressure vessel having an inner diameter of 8.25 inches, with a riser having an inner diameter of 5.2 inches. The test media sample was 8" in diameter by 4" wide. Testing was performed using generator oil according to Standard Protocol No. Air_SOP.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filtration device comprising:
   a pressure vessel having an inlet and an outlet and configured to filter a pressurized fluid stream;
   at least one disk-shaped filter element housed within the pressure vessel arranged to filter fluid flowing from the inlet to the outlet; and
   an inlet flow tube disposed within the pressure vessel proximate the inlet, the inlet flow tube configured to direct the pressurized fluid stream from the inlet towards a central portion of the at least one disk-shaped filter element.

2. The filtration device of claim 1, wherein the pressure vessel comprises a tubular portion with first and second domed portions at opposite ends of the tubular section, an inlet tube attached at one end of the pressure vessel to an opening in the first domed portion, and an outlet tube attached at another end of the pressure vessel to an opening in the second domed portion.

3. The filtration device of claim 2, wherein the inlet flow tube comprises a cylindrical portion with an annular support ring attached to an end of the cylindrical portion nearest the inlet tube.

4. The filtration device of claim 3, wherein an outer perimeter surface of the support ring is in sealing relation to the interior surface of the tubular portion of the pressure vessel, the annular support ring being angled with respect to the interior surface of the tubular portion of the pressure vessel such that the annular support ring helps direct the pressurized fluid stream towards the center of the at least one disk-shaped filter element.

5. The filtration device of claim 3, wherein the annular support ring has a notch at the top and bottom of the support ring to allow fluid to move from one side of the annular support ring to the other within the pressure vessel.

6. The filtration device of claim 3, wherein the space between an outer diameter of the cylindrical portion of the inlet flow tube and an inner diameter of the tubular portion of the pressure vessel defines an annular gap, wherein the annular gap is between 1 and 12 inches.

7. The filtration device of claim 2, further comprising an access port integral with the pressure vessel and disposed between the inlet tube and the outlet tube, the access port configured to provide access to the at least one disk-shaped filter element, wherein the access port includes an access port door with a plate attached thereto, the plate configured to limit the radial movement of the at least one disk-shaped filter element.

8. The filtration device of claim 7, wherein the pressure vessel is substantially cylindrical and has a longitudinal axis, and wherein the access port is substantially circular and has a longitudinal axis that is substantially perpendicular to the longitudinal axis of the pressure vessel.

9. The filtration device of claim 1, further comprising an outlet flow tube disposed within the tubular portion of the pressure vessel proximate the outlet, wherein the pressurized fluid stream causes the at least one disk-shaped filter element to move axially into sealing engagement with the outlet flow tube.

10. The filtration device of claim 9, further comprising a wire mesh mist extractor disposed within the outlet flow tube, the wire mesh mist extractor configured to extract liquids from the pressurized fluid stream.

11. The filtration device of claim 2, wherein the inlet tube is attached to the pressure vessel at one end and to an annular flange at an opposite end, wherein the inlet tube has a diameter smaller than a diameter of the tubular portion of the pressure vessel; and
   wherein the outlet tube is attached to the pressure vessel at one end and to an annular flange at an opposite end, wherein the outlet tube has a diameter smaller than the diameter of the tubular portion of the pressure vessel.

12. The filtration device of claim 1, wherein the pressure vessel further comprises:
   a first drain port located along a bottom portion of the pressure vessel proximate the outlet;
   a second drain port located along a bottom portion of the pressure vessel proximate the inlet;
   wherein the first drain port is normally open, and the second drain port is normally closed; and
   at least one vent coupled to a pressure relief valve, the vent located along a top portion of the pressure vessel, the vent and pressure relief valve configured to relieve pressure within the pressure vessel.

13. The filtration device of claim 1, wherein the pressure vessel has a pressure rating of at least 50 psi.

14. The filtration device of claim 7, wherein the access port is configured to permit installation and removal of the at least one disk-shaped filter element by hand.

15. The filtration device of claim 9, wherein the outlet flow tube is configured to sealingly engage the at least one disk-shaped filter element when the at least one disk-shaped filter element is subjected to the pressurized fluid stream.

16. The filtration device of claim 2, wherein the tubular portion of the pressure vessel includes an interior surface, and the at least one disk-shaped filter element includes an outer peripheral surface, and wherein the pressure vessel is sized such that there is sufficient clearance between the interior surface and the outer peripheral surface of the at least one disk-shaped filter element to allow the at least one disk-shaped filter element to slide freely in an axial direction within the pressure vessel.

17. The filtration device of claim 16, wherein a clearance between the interior surface and the outer peripheral surface of the at least one disk-shaped filter element allows for the simultaneous axial loading and radial loading of the at least one disk-shaped element.

18. The filtration device of claim 15, wherein the outlet flow tube comprises a cylindrical portion with an annular support ring attached to an end of a tubular portion of the pressure nearest an outlet tube attached at one end of the pressure vessel to an opening in a domed portion at the one end of the pressure vessel, and wherein an annular gap exists between an interior surface of the tubular portion of the pressure vessel and an exterior surface of the outlet flow tube.

* * * * *